US006027132A

United States Patent [19]

Robinson et al.

[11] Patent Number: 6,027,132

[45] **Date of Patent: *Feb. 22, 2000**

[54] WHEELCHAIR

[75] Inventors: William G. Robinson; James C. Thorpe; Robert A. Taylor, all of Fresno, Calif.

[73] Assignee: Sunrise Medical HHG Inc., Longmont, Colo.

[ * ] Notice: This patent is subject to a terminal disclaimer.

[21] Appl. No.: 08/579,483

[22] Filed: Dec. 27, 1995

Related U.S. Application Data

[63] Continuation-in-part of application No. 08/365,261, Dec. 28, 1994, Pat. No. 5,590,893.

[51] Int. Cl.[7] ........ B62M 1/14

[52] U.S. Cl. ........ 280/250.1; 16/19; 280/304.1; 297/364

[58] Field of Search ........ 280/250.1, 304.1, 280/661, 43; 16/18 R, 19, 18 A; 297/354.1, 361.1, 362.14, 362.12, 363, 364, 376, 354.12

[56] References Cited

U.S. PATENT DOCUMENTS

| | | | |
|---|---|---|---|
| D. 254,970 | 5/1980 | Honzyou | D12/12 |
| D. 278,217 | 4/1985 | Nassari | D12/131 |
| D. 306,712 | 3/1990 | Friedrich . | |
| D. 344,702 | 3/1994 | Robertson et al. . | |
| 1,274,165 | 7/1918 | Hormes | 16/19 |
| 1,342,500 | 6/1920 | Finch | 16/19 |
| 1,482,954 | 2/1924 | Tideman | 16/19 |
| 1,491,204 | 3/1924 | Epting | 16/19 |
| 2,565,867 | 8/1951 | Lundquist | 297/376 |
| 2,918,300 | 12/1959 | Hendrickson | 280/43 |
| 3,379,450 | 4/1968 | Jones et al. . | |
| 3,784,252 | 1/1974 | Peterson | 297/364 |
| 3,866,250 | 2/1975 | Bradford | 297/364 |
| 3,882,949 | 5/1975 | Anderson | 280/DIG. 10 |
| 4,351,540 | 9/1982 | Minnebraker | 280/250.1 |
| 4,405,142 | 9/1983 | Whetstine . | |
| 4,477,098 | 10/1984 | Minnebraker . | |
| 4,650,201 | 3/1987 | Hartwell . | |
| 4,652,005 | 3/1987 | Hartwell . | |

(List continued on next page.)

FOREIGN PATENT DOCUMENTS

| | | | |
|---|---|---|---|
| 501986 | 5/1954 | Canada . | |
| 312969 A2 | 4/1989 | European Pat. Off. . | |
| 2563993 | 11/1985 | France . | |
| 3517050 | 11/1986 | Germany | 280/250.1 |
| 8631974 | 5/1987 | Germany . | |
| 456271 | 11/1936 | United Kingdom | 297/363 |
| 2249760 | 5/1992 | United Kingdom . | |
| WP93/08782 | 5/1993 | WIPO . | |
| 94011235 | 5/1994 | WIPO | 280/250.1 |

OTHER PUBLICATIONS

Action Pro Product Literature, pp. 10, 11, update Aug. 31, 1993.

*Primary Examiner*—Anne Marie Boehler
*Attorney, Agent, or Firm*—MacMillan, Sobanski & Todd, LLC

[57] ABSTRACT

Drive wheel axle assemblies (34, 34A) and caster wheel assemblies (94, 252) are mounted to a wheelchair frame (4, 222). One axle assembly (34) includes an axle adjustment tube (40) secured to the frame and an axle housing (56), defining an axle bore (58), toollessly mounted to the axle adjustment tube at any of several rotary orientations to determine the camber of the drive wheel (36) mounted to the axle assembly. The front to rear position of the axle housing can also be adjusted in a toolless manner using a quick release pin (66). The height of the front end (10) of the frame is changed, to ensure that the caster wheel pivot axis (96) remains vertical, without tools by mounting a caster wheel (98) at various vertical positions within a caster spool housing (100) without exposing the user to oil and grease on the spindle (120) and bearings (121). Another axle assembly (34A) permits the height of the drive wheels (254) to be changed without the used tools. The seat back angle can also be changed without tools by a user while sitting in the wheelchair.

15 Claims, 25 Drawing Sheets

U.S. PATENT DOCUMENTS

| | | | |
|---|---|---|---|
| 4,721,321 | 1/1988 | Haury et al. . | |
| 4,730,842 | 3/1988 | Summers et al. . | |
| 4,768,797 | 9/1988 | Friedrich | 280/42 |
| 4,805,925 | 2/1989 | Haury et al. | 280/250.1 |
| 4,813,693 | 3/1989 | Lockard et al. | 280/42 |
| 4,955,624 | 9/1990 | Jeun-Long | 280/42 |
| 4,966,379 | 10/1990 | Mulholland . | |
| 4,969,232 | 11/1990 | Michel | 280/250.1 |
| 4,989,890 | 2/1991 | Lockard et al. | 280/42 |
| 5,020,816 | 6/1991 | Mulholland . | |
| 5,028,064 | 7/1991 | Johnson | 280/250.1 |
| 5,060,962 | 10/1991 | McWethy | 280/304.1 |
| 5,131,672 | 7/1992 | Robertson . | |
| 5,152,543 | 10/1992 | Sims et al. | 280/250.1 |
| 5,253,888 | 10/1993 | Friedrich | 280/250.1 |
| 5,259,635 | 11/1993 | Picker | 280/250.1 |
| 5,267,745 | 12/1993 | Robertson . | |
| 5,333,894 | 8/1994 | Mayes . | |
| 5,409,247 | 4/1995 | Robertson et al. . | |
| 5,551,756 | 9/1996 | Gurasich et al. | 297/354.12 |
| 5,590,893 | 1/1997 | Robinson et al. | 280/250.1 |
| 5,593,211 | 1/1997 | Jay et al. | 297/376 |

WHEELCHAIR

CROSS REFERENCE TO RELATED APPLICATION

This is a continuation-in-part application of application Ser. No. 08/365,261, filed Dec. 28, 1994, now U.S. Pat. No. 5,590,893, entitled Wheelchair Frame Assembly, the disclosure of which is incorporated by reference.

BACKGROUND OF THE INVENTION

During the last couple of decades, wheelchairs suitable for action or sports use, such as playing basketball, tennis and other activities, have come into use. The chairs are characterized by their light weight and adjustable wheels. The wheels can be adjusted so that their camber can be changed from 0°, that is, with the rear, driving wheels located in a vertical plane, to 12°, or sometimes more, where the top of the wheel is closer to the chair than the bottom of the wheel. By changing the camber on the drive wheels, height of the front caster wheels also needs to be changed to adjust the toe in or toe out of the drive wheels as well as to keep the main pivot axis of each of the caster wheels vertical.

With conventional sport or action chairs, the camber adjustment takes the user a significant amount of time. Adjusting the camber often requires removing quite a number of parts and adding or subtracting washers or other spacers to achieve the proper angle. Even when done by a trained technician, the process still takes considerable time. It is a cumbersome, time-consuming job, and requires use of wrenches to torque the nuts to proper tightness. During this procedure, in which two washers typically represent 3° of camber, it is easy to lose washers and to mount the wrong number of washers to the mounting bolt, requiring the job to be redone.

Wheelchairs come in different heights primarily to accommodate the different lengths of the user's legs. This creates a problem for organizations that must supply wheelchairs to a number of individuals, such as wheelchair rental companies, hospitals and nursing homes. Because of different height requirements, a great number of wheelchairs must be kept in stock to accommodate various users. A number of wheelchairs have been designed so that the height of the main drive wheels can be adjusted in various ways. However, these designs generally require some sort of disassembly of the mounting components using tools, an often cumbersome and time-consuming process.

SUMMARY OF THE INVENTION

The present invention solves many of the problems of conventional sport wheelchairs. All adjustments to the camber of the drive wheels and height of the front caster wheels are made without tools but completely by hand, and without the need for changing or adding additional parts. The same toolless adjustment concept is also used in a relatively inexpensive, adjustable height, and preferably folding, wheelchair.

A wheelchair frame assembly made according to one aspect of the invention includes a frame having spaced-apart lower portions to which drive wheel axle assemblies and caster wheel assemblies are mounted. Each axle assembly includes an axle adjustment member, typically a tube, secured to the frame and an axle housing, defining an axle bore, mounted to the axle adjustment tube at a chosen rotary orientation. The chosen rotary orientation determines the camber of the drive wheel mounted to the axle assembly. The mounting of the axle housing is accomplished without the use of tools so that the user can manually change the camber of the drive wheel in an extremely simple manner.

The front to rear position of the axle housing can also be, in one preferred embodiment, adjusted in a toolless manner, typically through the use of a quick release pin designed to engage or disengage various recesses formed in the axle adjustment tube. By moving the rear axle forward the wheelchair is more responsive; however, doing so also increases any tendency for the wheelchair to tip over. The axle housing preferably includes an axle adjustment block and an adjustable axle lug mounted within a transverse bore formed in the axle adjustment block. The axle lug defines an axle bore within which a quick release axle, which passes through the drive wheel, is housed. The position of the adjustable axle lug can be changed to move the hub of the drive wheel closer towards or farther away from the frame to accommodate personal preferences and to ensure that the wheel does not rub against the frame as the camber of the drive wheel is changed.

Changing the camber of the drive wheel requires that the distance between the front end of the frame and the support surface be changed to adjust the toe in or toe out of the drive wheel as well as to ensure that the caster wheel pivot axis remains substantially vertical. This is preferably accomplished in a toolless manner by mounting the caster spool of the caster wheel to the frame at various vertical positions using a caster spool housing. A quick release pin engages selected indentations or recesses in the caster spool so to lock the caster spool to the caster spool housing at the desired height without the use of tools.

Another feature of the invention is in the construction of the caster wheel assembly. The caster wheel assembly includes a caster spool having a bore and a caster wheel including a wheel mount, a wheel rotatably secured to the wheel mount and a spindle extending upwardly from the wheel mount into the bore of the caster spool. The spindle is rotatably secured within the bore of the caster spool by one or more bearings. Since the bearings are captured between the caster spool and the spindle, and since the entire caster wheel assembly is removed and replaced, removal and replacement can be done without subjecting the user to getting oil and grease on the user's hands and clothes, which could occur if the spindle and bearings were not so enclosed. This constructions also aids in the repair or replacement of any defective bearings since such repair can be done apart from the wheelchair.

A further feature of the invention relates to an adjustable seat back assembly. The seat back support can be pivotally mounted to the frame at its lower end for positioning at different front-to-rear angular orientations. The angular orientation of the seat back support can be changed by the user while sitting in the wheelchair by simply, in one preferred embodiment, pulling on a lanyard, which disengages spring-biased release pins, to permit the seat back support to be pivoted forwardly or rearwardly according to the desires or needs of the user. This toolless adjustment not only eliminates the needs for tools but also permits the user to easily adjust the angle of the seat back simply and quickly several times a day if desired. This feature not only helps to ensure user comfort but also helps to change pressure points, by changing the seat back angle, to help reduce the incidence of pressure sores.

The primary advantage of the invention is that the desired positional adjustments are all simply made without the need for tools; this makes making such adjustments easy and quick. No additional parts, such as shims or washers, are needed to change the camber, height or other position or orientation of the drive wheels or caster wheels. This eliminates the need for carrying such extra parts and the possibility of losing necessary parts.

Another advantage of the invention is that its simplicity of design and ease of assembly can reduce assembly costs for the manufacturer. This translates into a lower cost chair for the user.

Other features and advantages of the invention will appear from the following description, in which the preferred embodiments have been set forth in detail in conjunction with accompanying drawings.

DESCRIPTION OF THE PREFERRED EMBODIMENTS

Figure 1:
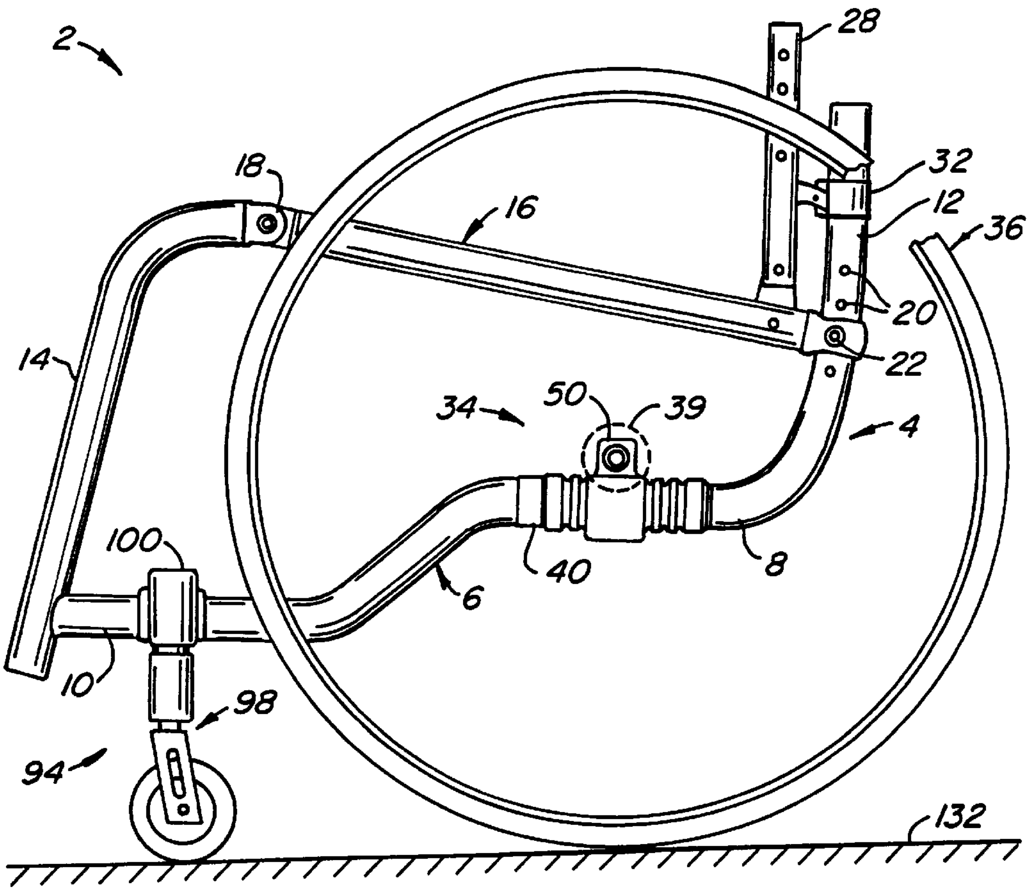
FIG. 1 is a side elevational view showing a wheelchair frame assembly made according to the invention.
Figure 2:
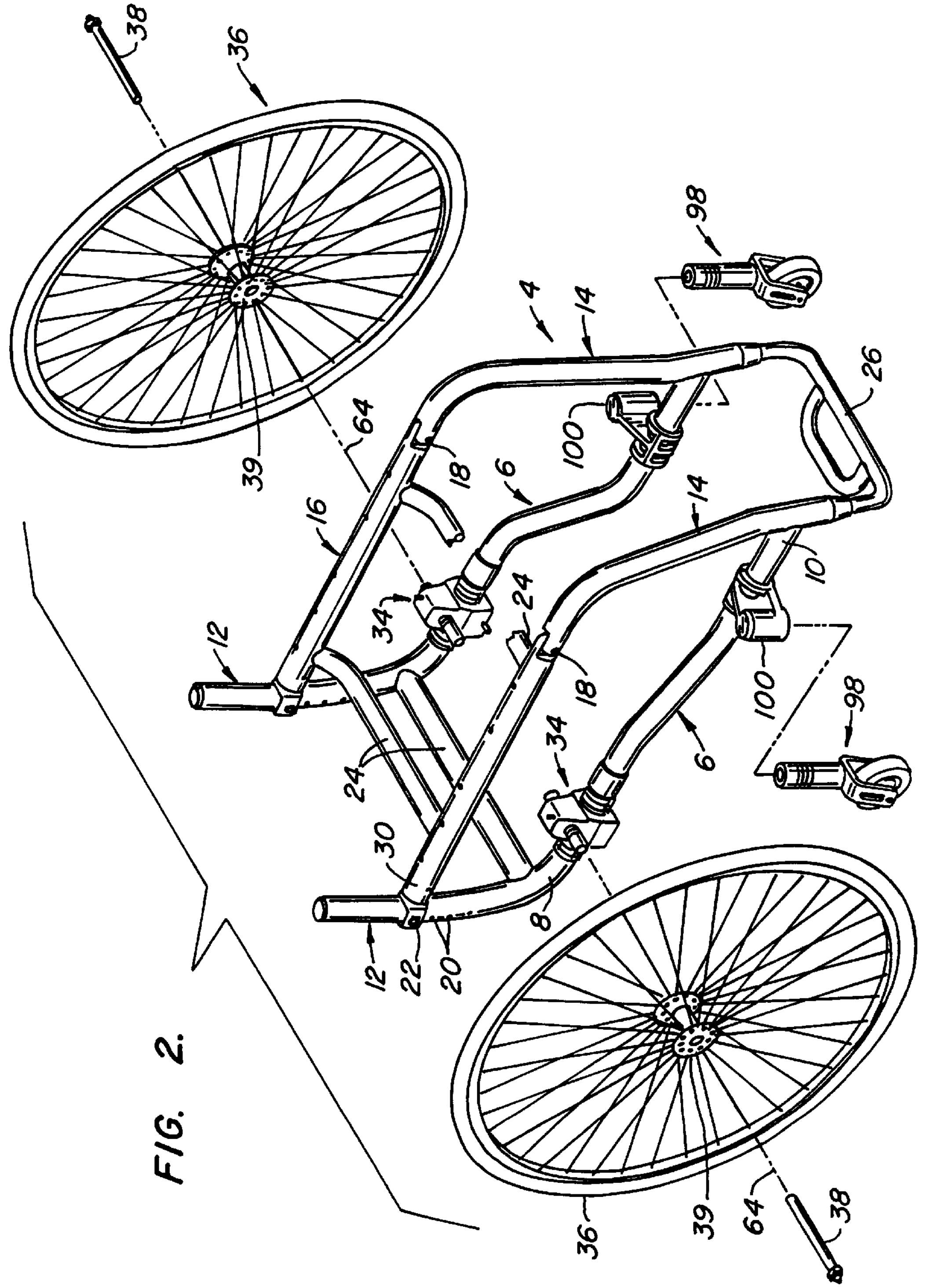
FIG. 2 is an exploded isometric view of the wheelchair frame assembly of FIG. 1 but without the seat back support shown in FIG. 1 but including a foot rest.

FIG. 1 illustrates a wheelchair frame assembly 2, most of the components of which are also shown in FIG. 2. Assembly 2 includes broadly a frame 4 having a pair of spaced-apart lower frame portions 6, each of which has a rear end 8 and a front end 10. A rear frame portion 12 extends upwardly from rear end 8 of lower frame portion 6 and a front frame portion 14 extends upwardly from front end 10 of lower frame portion 6. The upper ends of front and rear frame portions 14, 12 are coupled by seat portions 16. Seat portions 16 are each pivotally mounted to the upper end of front frame portion 14 at a pivot 18 and adjustably mounted to one of several positions 20 along rear from portion 12 through use of a quick release pin 22. Each of the sides of frame 4 are connected by lateral braces 24 and a footrest 26. An adjustable seat back support 28, shown in FIG. 1 only, is mounted to the rear end 30 of seat portion 16 and to rear frame portion 12 using a slider 32. A seat and backrest are mounted to frame assembly 2 during use but are not shown for simplicity of illustration.

Figure 3:
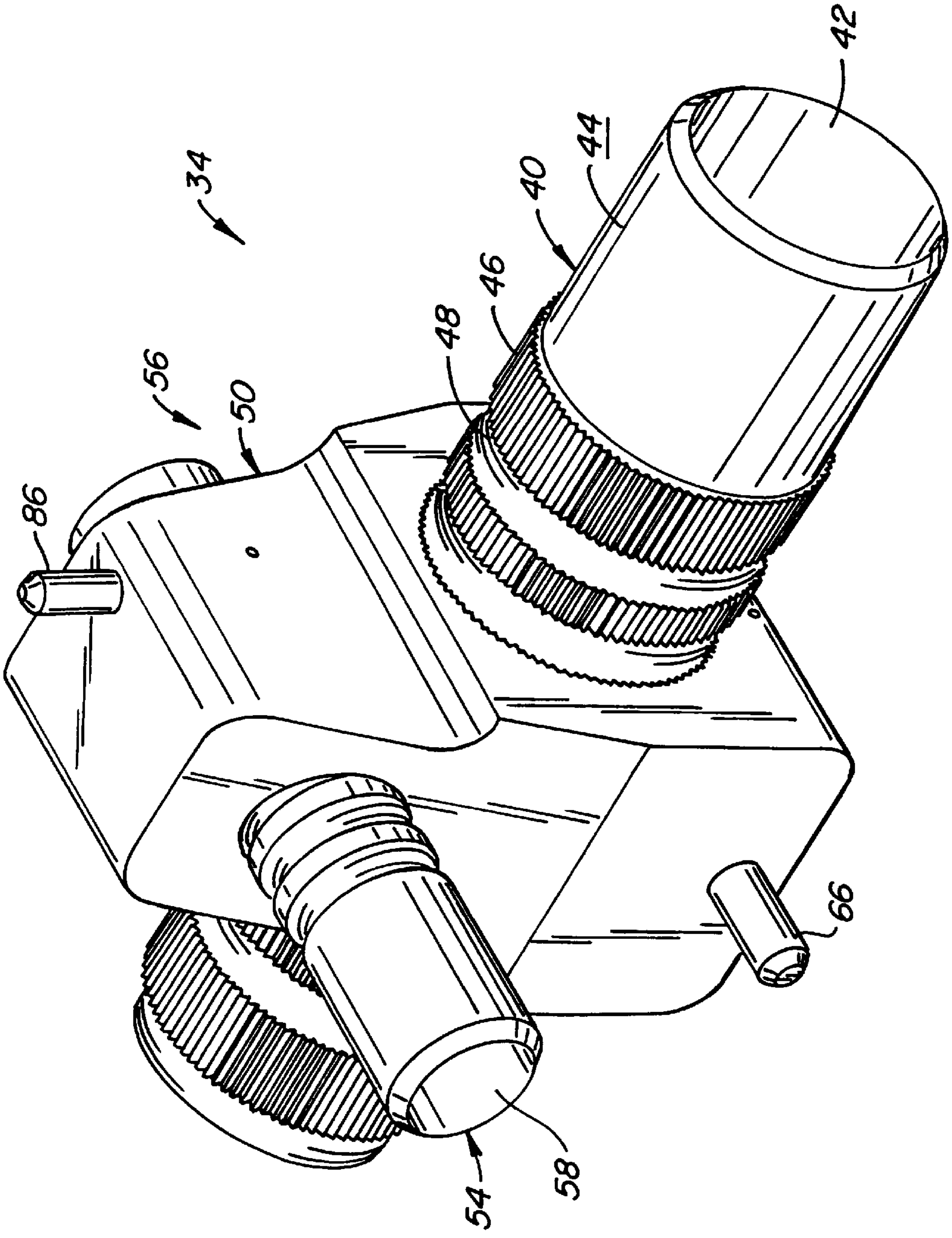
FIG. 3 is an enlarged view of the axle assembly of FIGS. 1 and 2.
Figure 3A:
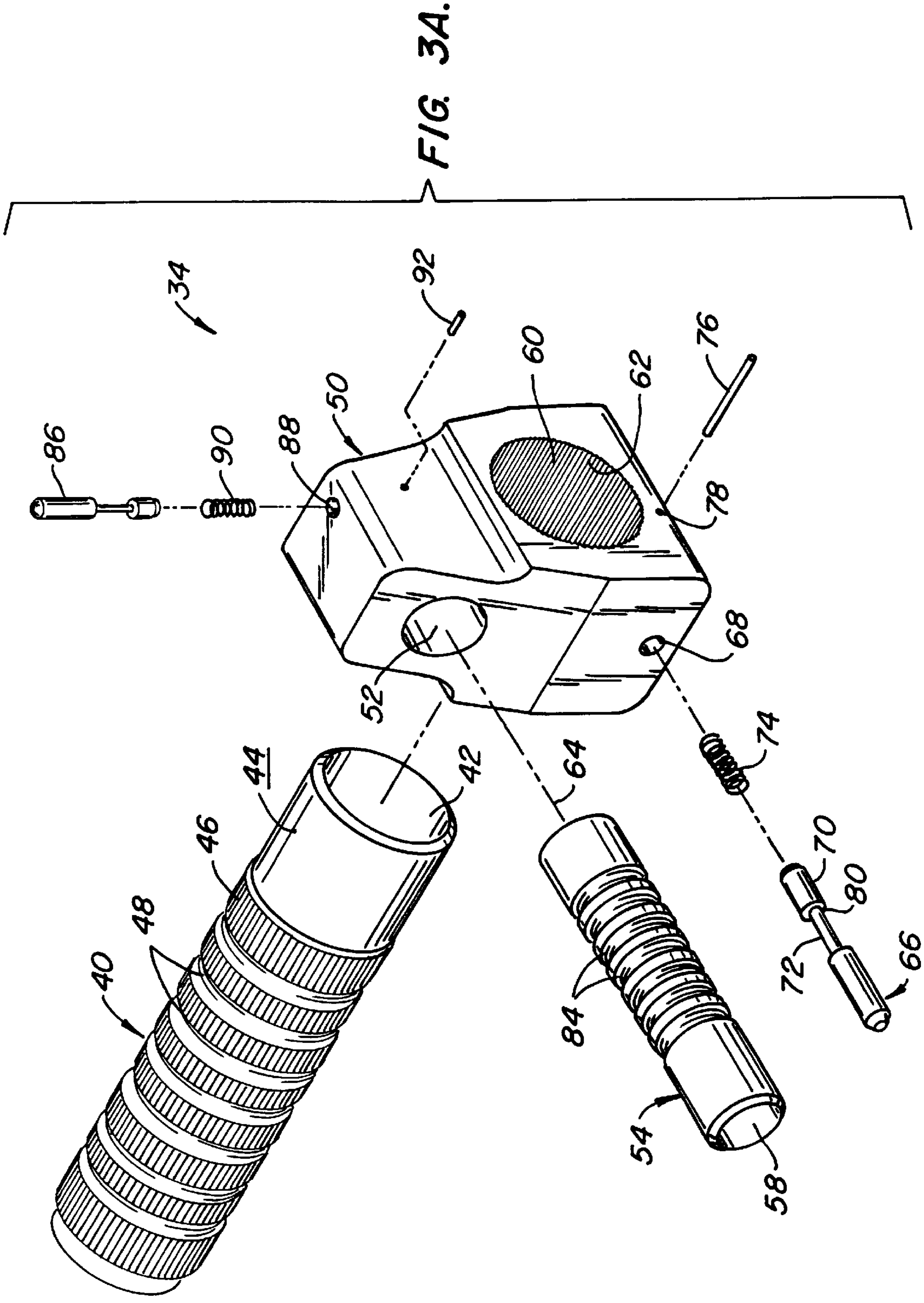
FIG. 3A is an exploded isometric view of the axle assembly of FIG. 3.

An axle assembly 34 is mounted to each lower frame portion 6 adjacent to rear end 8. Axle assembly 34 is used to mount a typically conventional drive wheel 36 using a conventional quick release axle 38 passing through the hub 39 of drive wheel 36. FIGS. 3 and 3A illustrate axle assembly 34 to include an axle adjustment member or tube 40 having a bore 42 sized to mount over and be secured to lower frame portion 6, typically by glue or other bonding agent. Tube 40 has an outer surface 44 including axially extending splines 46 and a series of axially extending, circumferential grooves 48 formed within the splined outer surface 44.

Axle assembly 34 also includes an axle adjustment block 50 having a transverse bore 52 sized to house a generally cylindrical, adjustable axle lug 54. Together, axle adjustment block 50 and adjustable axle lug 54 constitute an axle housing 56. Lug 54 defines an axle bore 58 within which quick release axle 38 is housed. Axle adjustment block 50 also includes a main bore 60 having a splined inner surface 62 constructed to mate with splines 46 on surface 44 of tube 40.

In the preferred embodiment, splined inner surface 62 and splines 46 on surface 44 contain ninety equally spaced splines, each spline spaced 4° apart. Since tube 40 is fixed to lower frame portion 6, the rotary orientation of block 50 relative to tube 40 determines the angular inclination of a drive wheel axis 64 defined by axle bore 58 and thus the cant of wheel 36. To aid the user in the proper rotary orientation of block 50 and tube 40, appropriate alignment lines can be drawn and labeled, for example 0°, 4°, 8°, 12°, on surface 44 of axle adjustment tube 40 for alignment with an appropriate index marker on axle adjustment block 50.

Figure 5A:
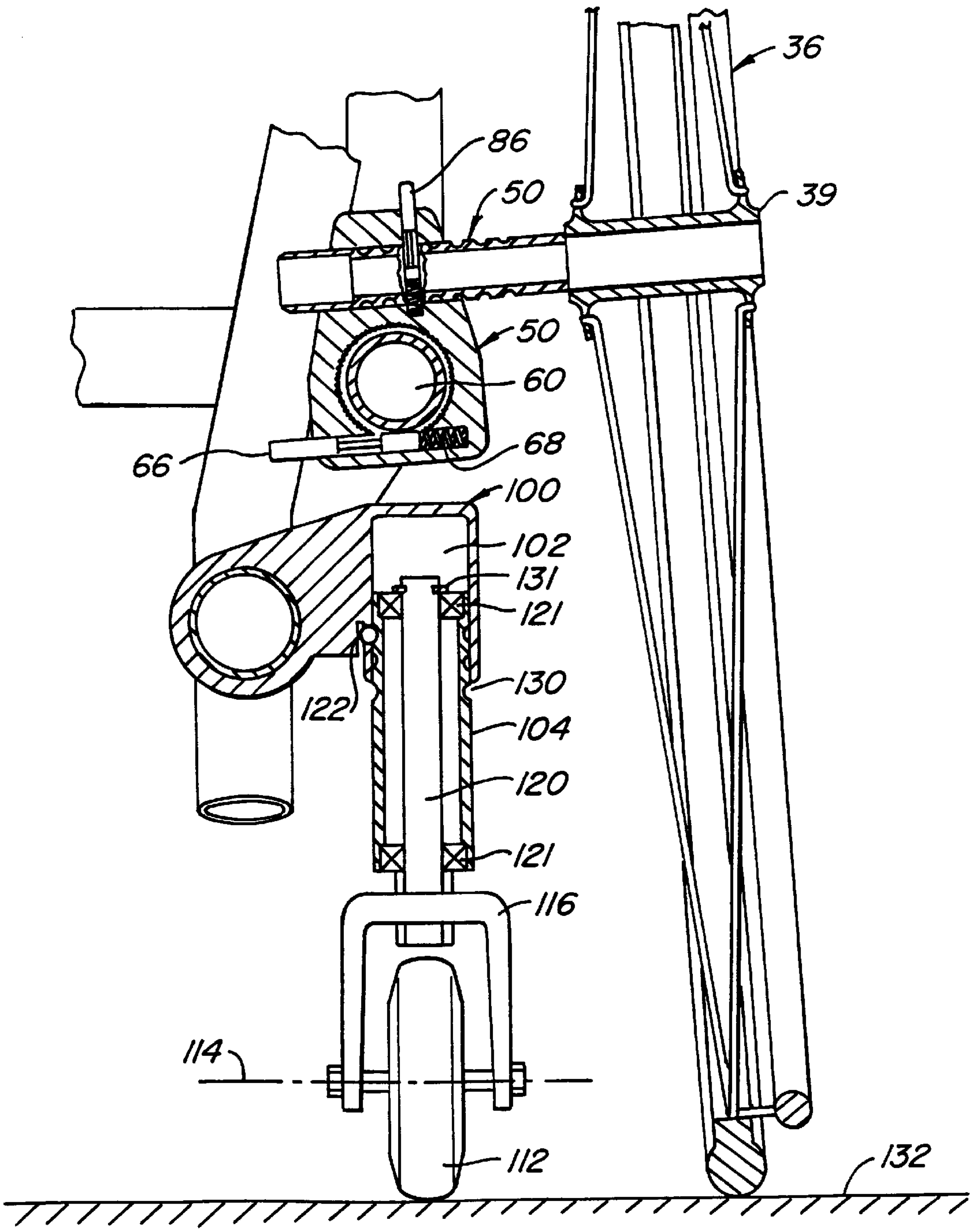
FIGS. 5A–5C are partial cross-sectional views showing the axle assembly and caster wheel assembly when the drive wheel is at 4° camber, an 8° camber, and a 12° camber, respectively.
Figure 5B:
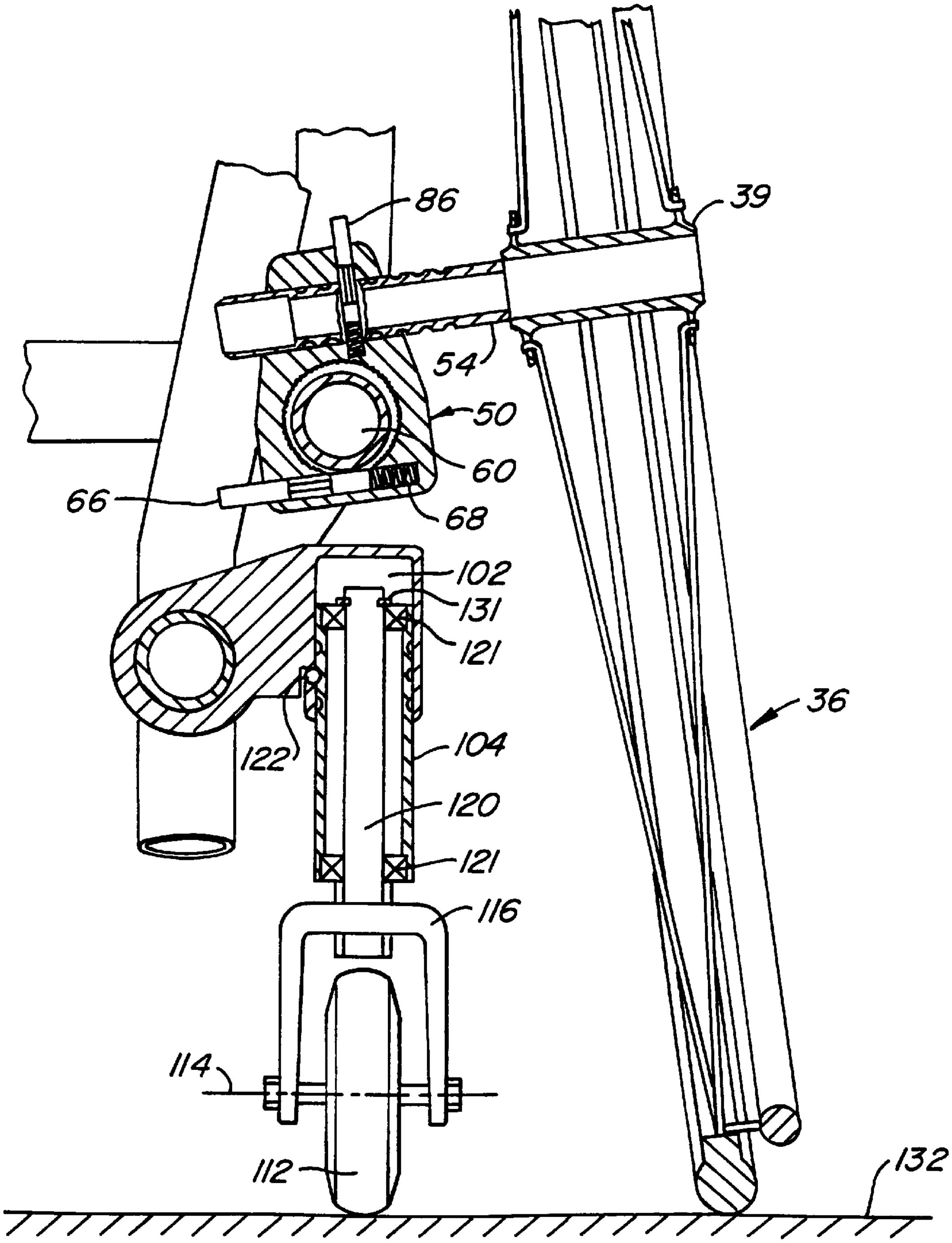
Figure 5C:
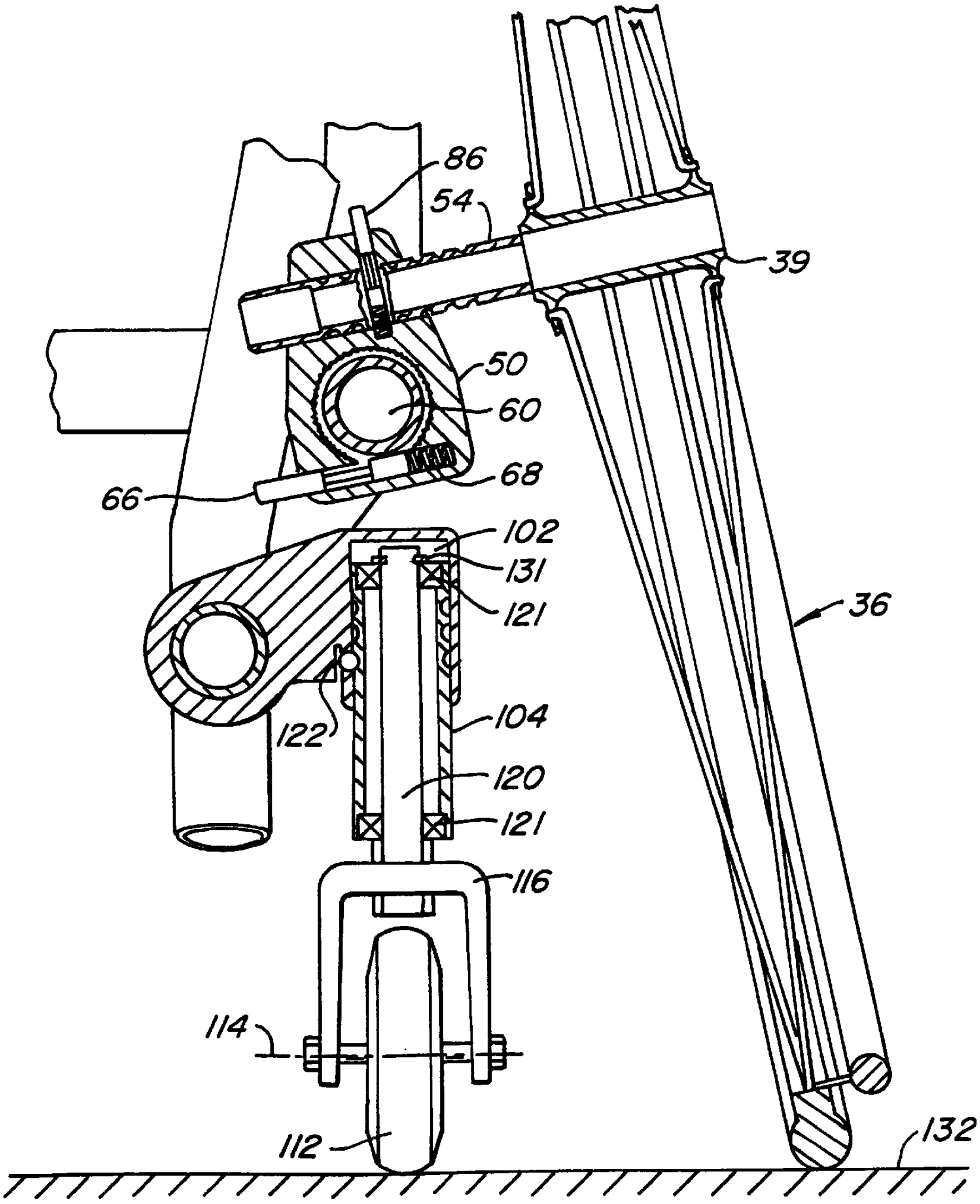

Block 50 is locked at a front-to-back position along surface 44 of tube 40 through the use of a quick release pin 66 mounted within a blind bore 68 which intersects main bore 60, as shown in FIGS. 5A–5C. Pin 66 has a full diameter portion 70 and a reduced diameter portion 72, the end of full diameter portion 70 pressing against a compression coil spring 74 which normally biases pin 66 out of blind bore 68. To keep pin 66 housed within blind bore 68, a roll pin 76 is pressed into a roll pin hole 78, formed transverse to blind bore 68, to intersect the blind bore and engage a shoulder 80 of pin 66 between portions 70, 72. Accordingly, when quick release pin 66 is in the locked or use position of FIG. 3, full diameter portion 70 is partially within main bore 60 and is in one of grooves 48 formed in surface 48 of tube 40.

To adjust the front/back position of drive wheel 36, the user simply presses on quick release pin 66 so to disengage full diameter portion 70 from groove 48, which permits axle housing 56 to slide along axle adjustment tube 40. When the desired front/back position is achieved, quick release pin 66 is released and full diameter portion 70 snaps into the groove 48 with which it is aligned. Changing the camber of wheel 36 is similar but axle housing 56 is moved in a forward direction until splined inner surface 62 completely disengages splines 46 to permit axle housing 56 to be rotated relative to tube 40 and then slid back onto tube 40 when the proper rotary orientation, and thus the proper camber, is achieved.

The distance wheel hub 40 is from frame 4 can be changed based upon the user's personal preference and also to keep the top of drive wheel 36 from rubbing against frame 4 when larger cambers, such as 12°, are used. To do so, adjustable axle lug 54 has a set of circumferential grooves 84 formed in its outer surface. Grooves 84 are engaged by a quick release pin 86 housed within a blind bore 88 and biased outwardly by compression coil spring 90 in a manner similar to quick release pin 66. Pin 86 is kept from being urged completely out of hole 88 by a roll pin 92. Pressing on quick release pin 86 allows the user to adjust the position of axle lug 54 along drive wheel axis 64, thus changing the location of drive wheel hub 40 relative to frame 4.

Figure 4:
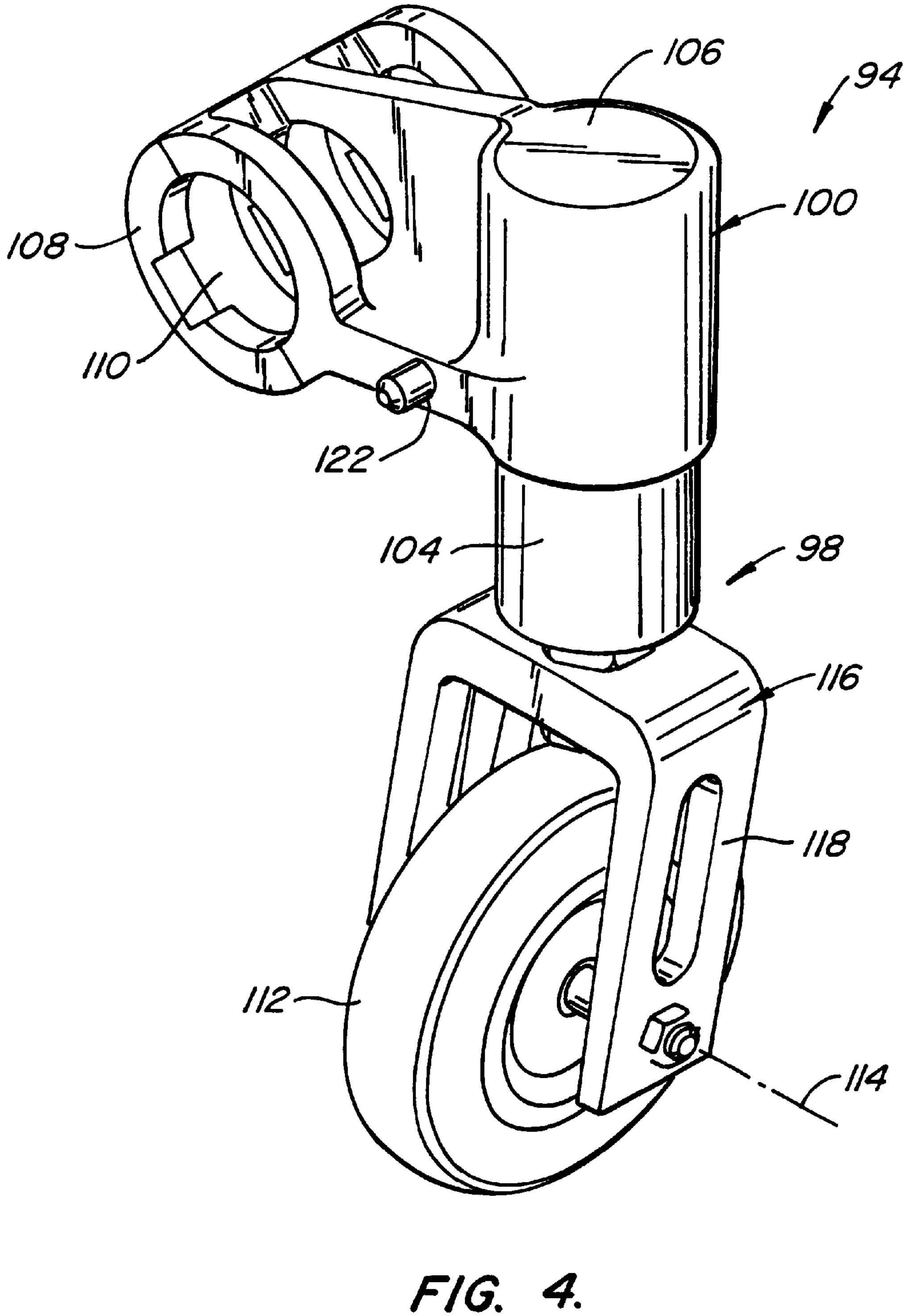
FIG. 4 is an enlarged view of the caster wheel assembly of FIGS. 1 and 2.
Figure 4A:
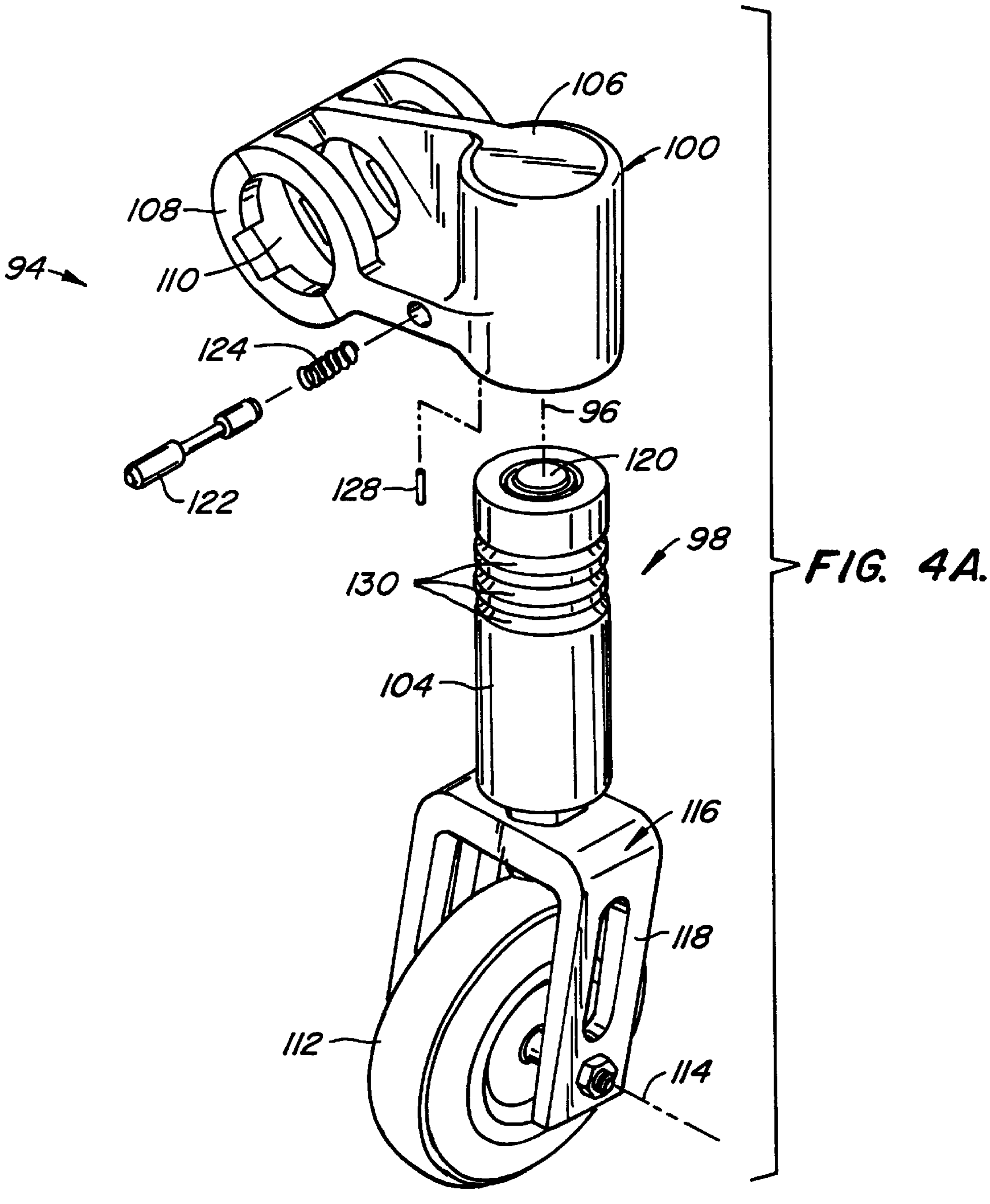
FIG. 4A is an exploded isometric view of the caster wheel assembly of FIG. 4.

Adjusting the camber of drive wheel 36 often requires adjusting caster wheel assembly 94 to maintain the proper toe in or toe out of drive wheels 36 as well as to ensure that the pivot axis 96 of caster wheel assembly 94 remains substantially vertical to ensure the proper action of caster wheels 98. FIGS. 4 and 4A illustrate a caster wheel assembly 94, including a two-piece caster spool housing 100 having a blind bore 102, see FIGS. 5A–5C, within which the generally cylindrical caster spool 104 of caster wheel 98 is housed. Housing 100 includes a main portion 106 and a clamping portion 108 which define a cylindrical opening 110 sized to surround lower frame portion 6 adjacent front end 10 so to permit caster spool housing 100 to be clamped firmly to lower frame portion 6 using, for example, screws or bolts (not shown).

Caster wheel 98 includes a wheel 112 having a generally horizontal axis 114 mounted to a fork-like wheel mount 116 having a clevis portion 118 and a spindle portion 120 coaxial with pivot axis 96 and pivotally housed within caster spool 104 by a pair of bearings 121, preferably ball bearings, although sleeve bearings could also be used. Caster wheel assembly 94 also include a quick release pin 122 and a compression spring 124 housed within a blind bore 126 formed in housing 100; pin 122 is maintained within blind bore by a roll pin 128. Quick release pin 122, when in its normal outwardly biased position of FIG. 4, engages one of three grooves 130 formed in the outer surface of caster spool 104 to adjust the position of caster spool 104 within blind bore 102 and thus the distance between wheel 112 and lower frame portion 6.

One of the advantages of caster wheel assembly 94 is that bearings 121 are captured between spindle portion 120 and housing 100 as a part of caster wheel 98. This not only permits quick height adjustment of caster wheel 98, it makes removal and replacement of the caster wheel much cleaner; the person removing caster wheel 98 is not exposed to the messy grease and oil lubricating the spindle portion and bearings during adjustment or removal and replacement of the caster wheel. Also, if bearings 121 need to be replaced, this can be done easily since caster wheel 98 can be easily removed from the rest of the wheelchair and disassembled by removing spring clip 131 from spindle portion 120 and removing spindle portion 120 from within bearings 121 to provide access to bearings 121. Another advantage is that caster wheels 98 having different length caster spools 104 and/or different diameter wheels 112 can be easily and quickly installed. This permits a user to change from larger diameter wheels, useful for general use, to smaller diameter wheels, useful for activities, such as basketball, where maximum maneuverability is desired.

FIG. 5A illustrates drive wheel 36 at a 4° camber. In this position, quick release pin 122 engages the upper most of grooves 130 to maintain caster wheel pivot axis 96 vertical. It has been found that this upper most groove 130 is also usable when drive wheel 36 is adjusted for a 0° camber; the difference in height of rear end 8 of lower frame portion 6 above support surface 132 when at a 0° camber and a 4° camber is very small (0.25%) so as not to require a separate groove 130 for both the 0° camber and the 4° camber. FIGS. 5B and 5C illustrate drive wheel 36 at an 8° camber and a 12° camber, respectively. (Note that in FIGS. 5A–5C, quick release axle 38 is not shown.) With each of these increasing camber angles, quick release pin 122 engages a still lower groove 130, thus lowering front end 10 of lower frame portion 6 in an amount substantially equal to the distance rear end 8 of lower frame portion 6 is lowered at each of these different camber angles. In FIGS. 5A–5C the position of quick release pin 86 within one of groove 84 of adjustable axle lug 54 is not changed. If desired, the position of lug 54 within transverse bore 52 can be changed to change the distance between hub 40 and lower frame portion 6 to accommodate the personal preferences of the user and ensure that top of drive wheel 36 does not rub against or otherwise interfere with frame 4.

In use, the camber of each drive wheel 36 is adjusted by first removing drive wheel 36 from axle assembly 34 by removal of quick release axle 38. The rotary orientation of axle assembly 34, and thus the camber of drive wheel 36, is adjusted by pressing on quick release pin 66 and sliding axle housing 56 in a forward direction, that is, towards caster wheel assembly 94, until splines 46 disengage from splined inner surface 62. Axle housing 56 is then rotated the appropriate amount and slid back to re-engage splines 46 with splined inner surface 62. When the proper position of axle housing 56 is achieved, quick release pin 66 is released to permit full diameter portion 72 to engage the appropriate groove 48, thus locking axle housing 56 in position. If the distance between drive wheel hub 39 and lower frame 6 is to be changed, quick release pin 86 is depressed and adjustable axle lug 54 is moved within transverse bore 52 until properly positioned, at which time pin 86 is released to lock lug 54 in place. Drive wheel 36 can then be remounted to axle housing 56 using quick release axle 38 passing through drive wheel hub 39. When necessary, the height of front end 10 of lower frame portion 6 above support surface 132 can be adjusted by pressing on quick release pin 122, moving caster spool 104 within blind bore 102 and releasing quick release pin 122 when aligned with the appropriate groove 130.

Figure 6:
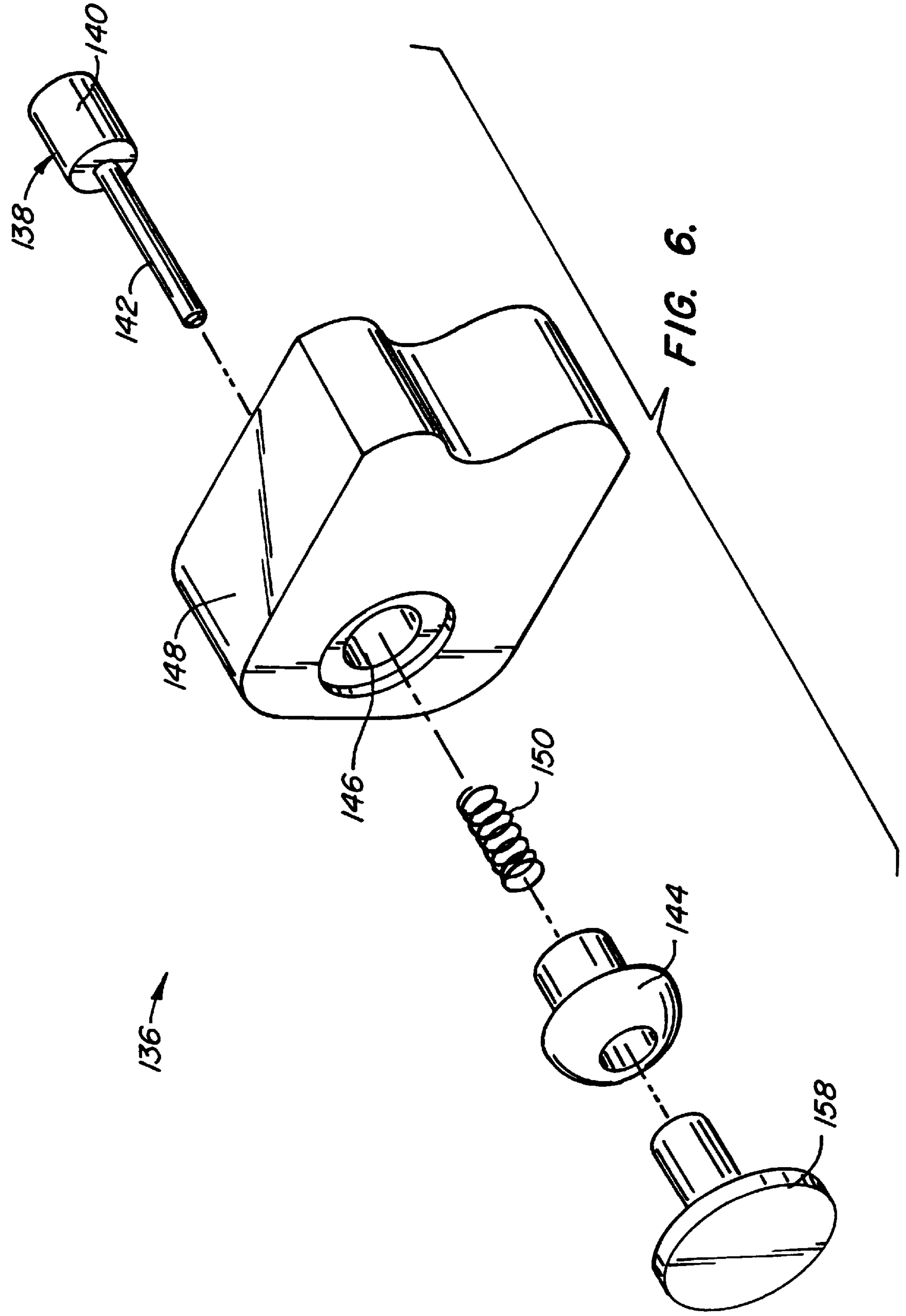
FIG. 6 is an exploded isometric view of an alternative embodiment of the quick release pin assembly shown in FIGS. 3A, 4A and 5A.
Figure 7A:
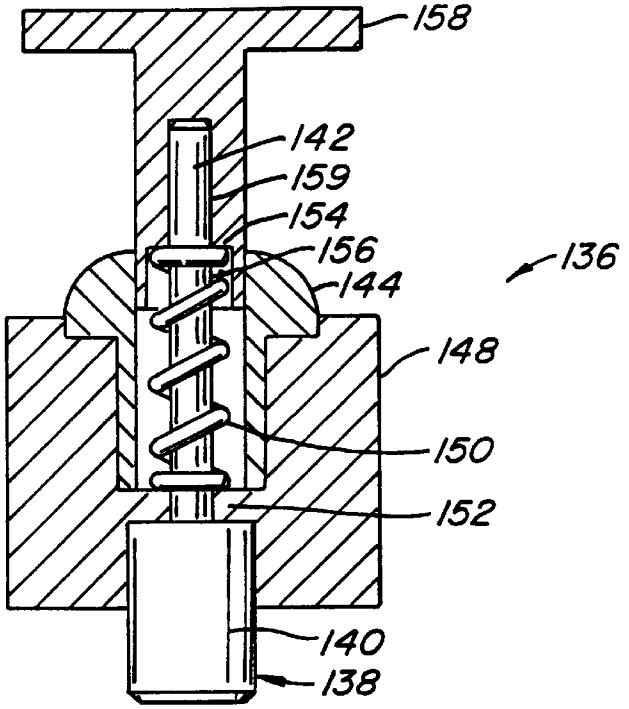
FIG. 7A and 7B are side cross-sectional views of the assembly of FIG. 6 shown with the pushbutton in its outwardly extended position in FIG. 7A, corresponding to the extended positions of the quick release pin assemblies of FIG. 5A, and with the pushbutton depressed in FIG. 7B.
Figure 7B:
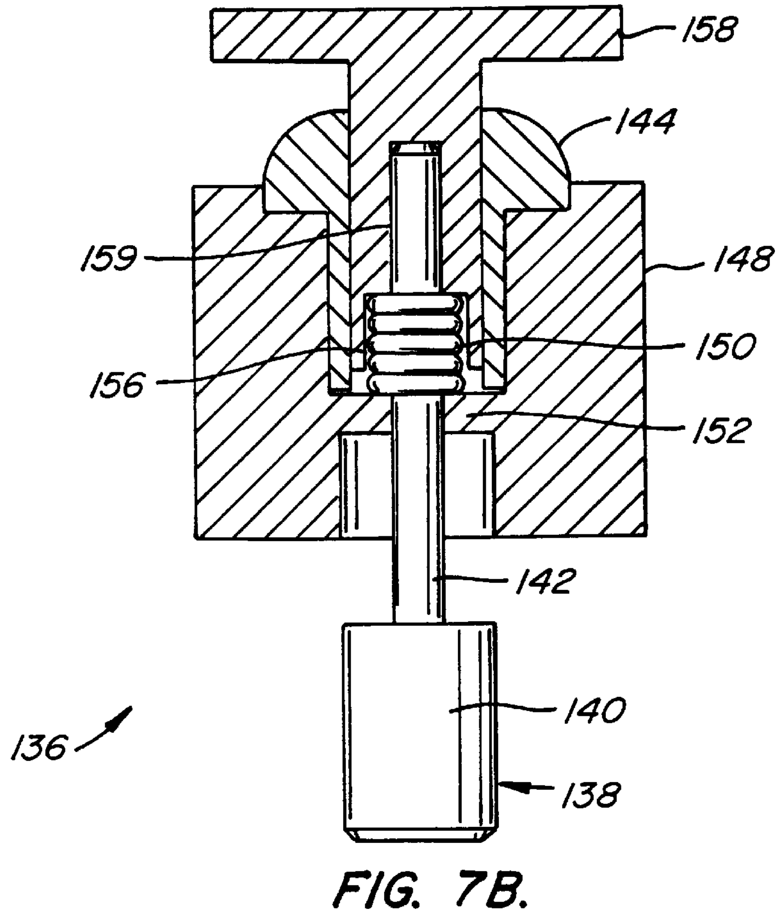

FIGS. 6, 7A and 7B illustrate an alternative embodiment of a quick release pin assembly 136 which can be used in lieu of the quick release pin assemblies discussed above. Assembly 136 includes a quick release engagement pin 138 having a larger diameter end 140 and a smaller diameter end 142. The assembly also includes a bushing 144 housed within one end of a multi-diameter bore 146 formed in a somewhat generic block 148. A coil spring 150 is mounted over end 142 of engagement pin 138. One end of spring 150 abuts against an annular ledge 152 formed in bore 146 while the other end of spring 150 abuts against the base 154 of a counterbore 156 formed in a push-button 158. End 142 of pin 138 is secured within an axial bore 159, such as through the use of an adhesive or by a friction fit. In the position of FIG. 7A, spring 150 is slightly compressed keeping larger diameter end 140 of pin 138 pressing against annular ledge 152. In this position, larger diameter end 140 can engage one of the various grooves formed in, for example, axle lug 54, axle adjustment tube 40 or caster spool 104. Pressing on push-button 158 compresses spring 150 to move end 138 to the position of FIG. 7B so to disengage pin 138 from the previously engaged groove to permit the appropriate removal or adjustment of the various parts. The quick release pin assembly 136 shown in FIGS. 6–7B is generally preferred because it requires less space and is easier to make and assemble than the quick release pin assemblies discussed above.

A further aspect of the invention relates to the ability of the user, while sitting in the wheelchair, to adjust the angle of seat back support 28 relative to rear frame portion 12 without the use of tools.

Figure 8:
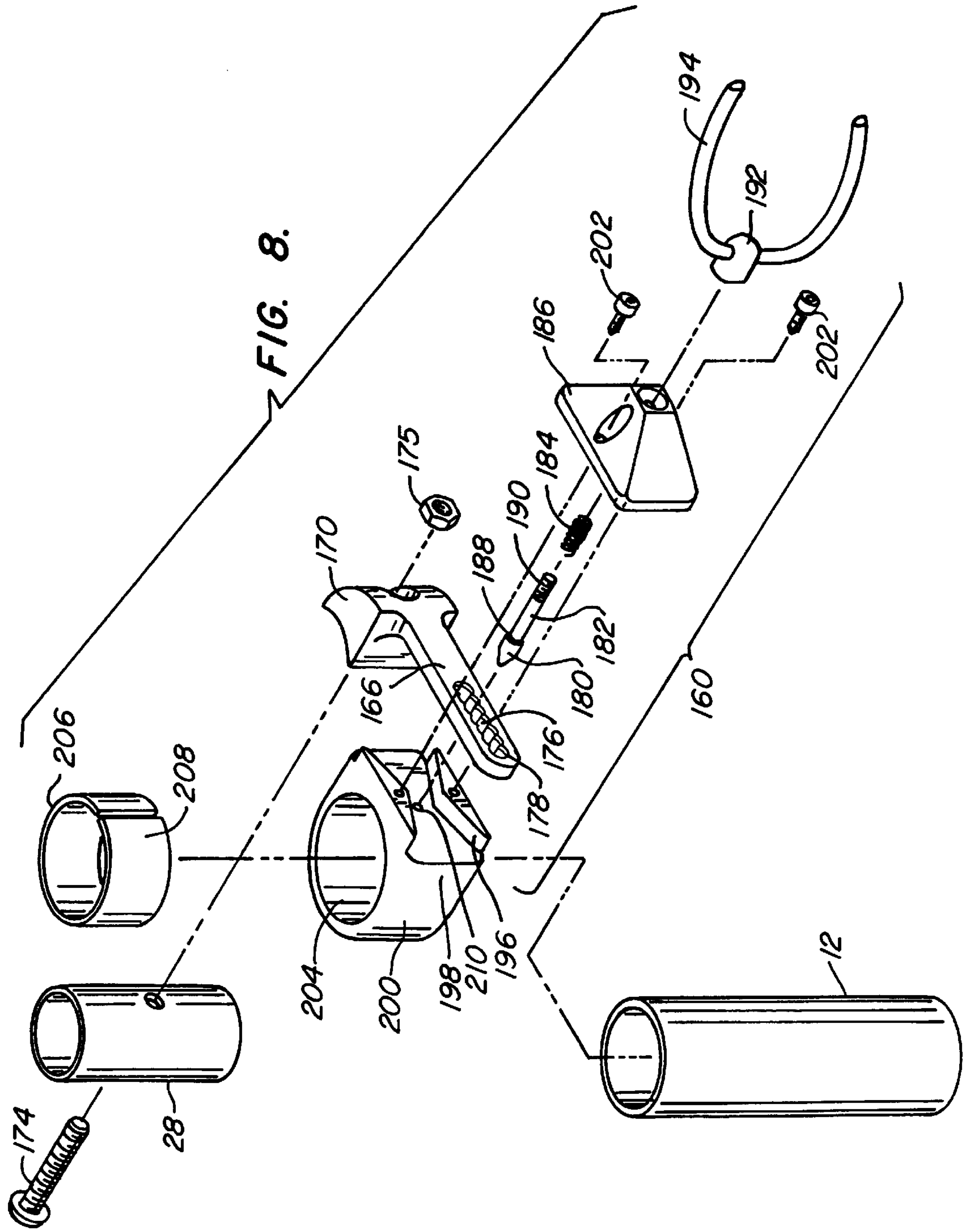
FIG.8 is an exploded isometric view of an adjuster assembly used to permit the seat back to be positioned in a plurality of forward to rearward pivotal positions by the user.
Figure 9:
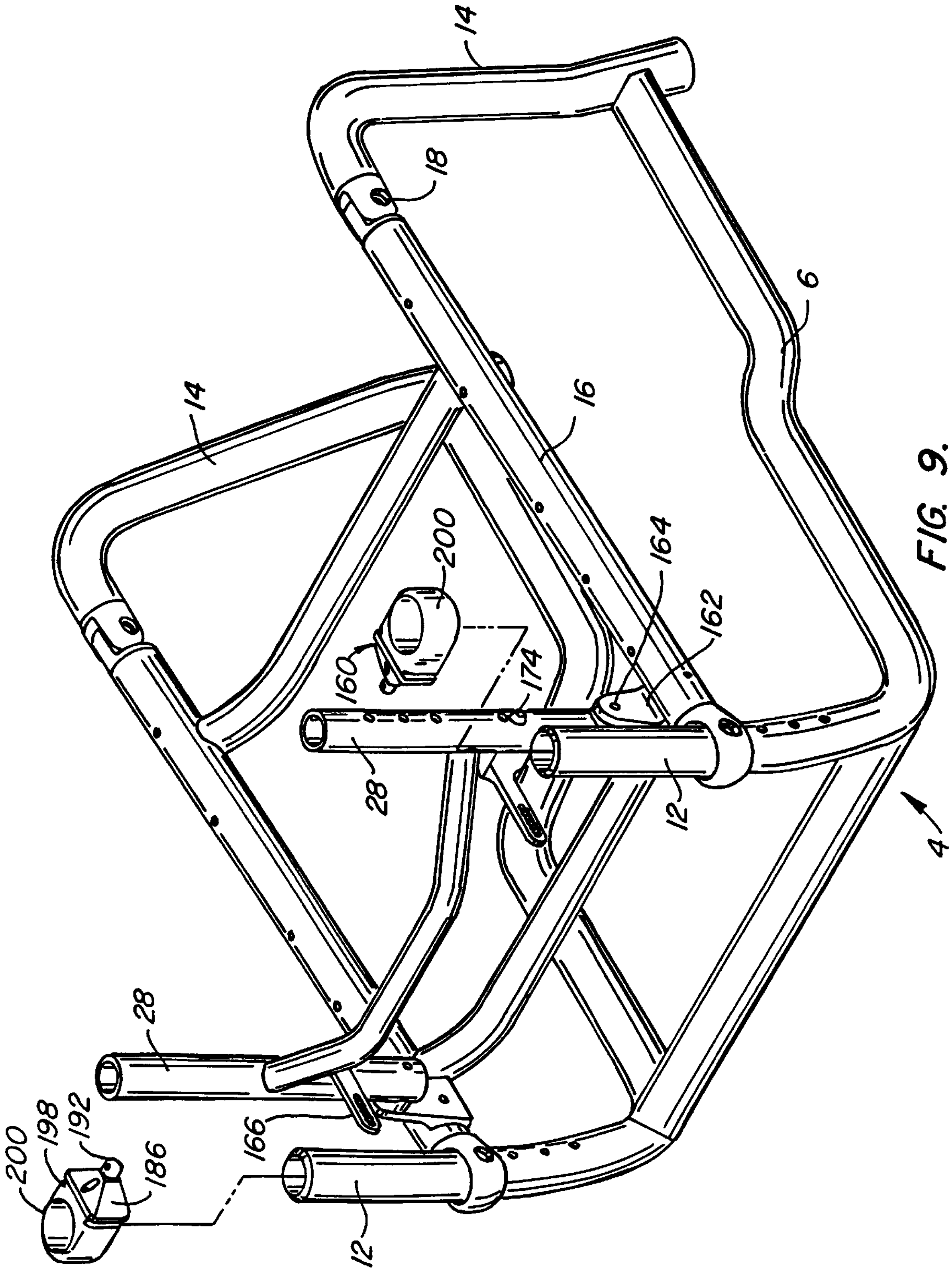
FIG. 9 is an isometric view of the wheelchair frame of FIG. 1 but using the adjuster assembly of FIG. 8.
Figure 9A:
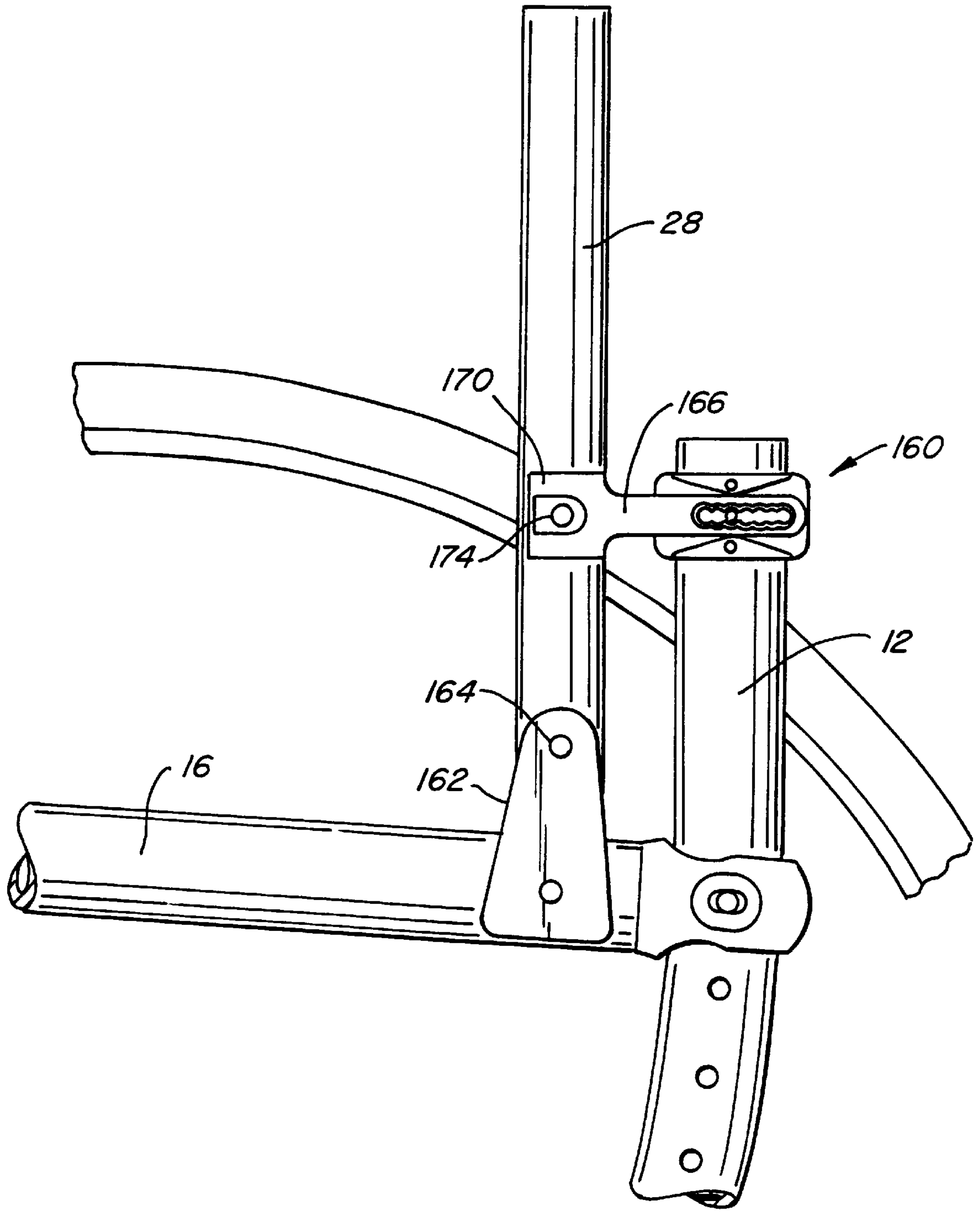
FIGS. 9A–9D are somewhat simplified to side views showing a portion of the frame of FIG. 9 and the adjuster assembly of FIG. 8 with a seat back support shown at different angular orientations in FIG. 9A–9C and being pivoted downwardly toward the seat portion of the frame assembly in FIG. 9D.
Figure 9B:
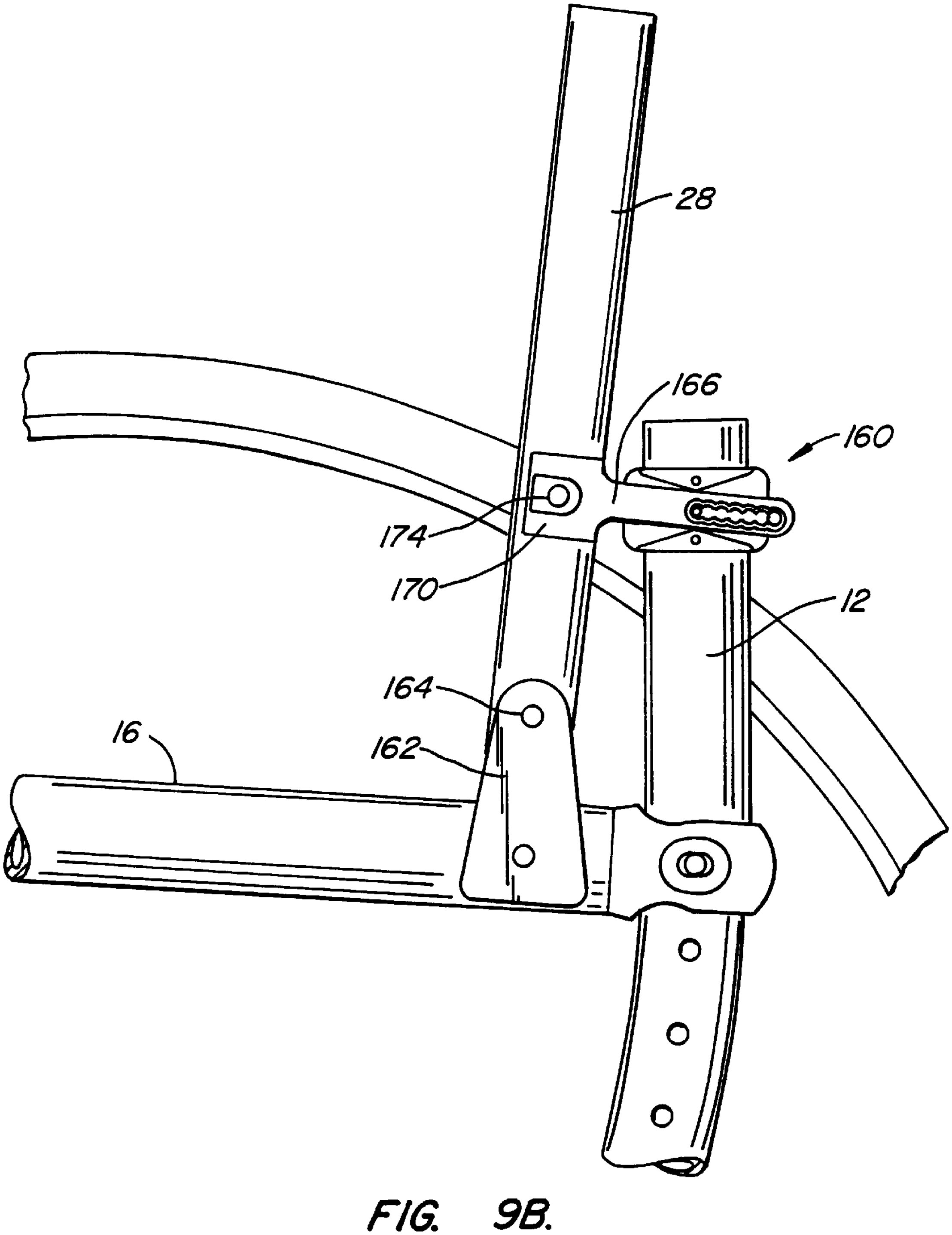
Figure 9C:
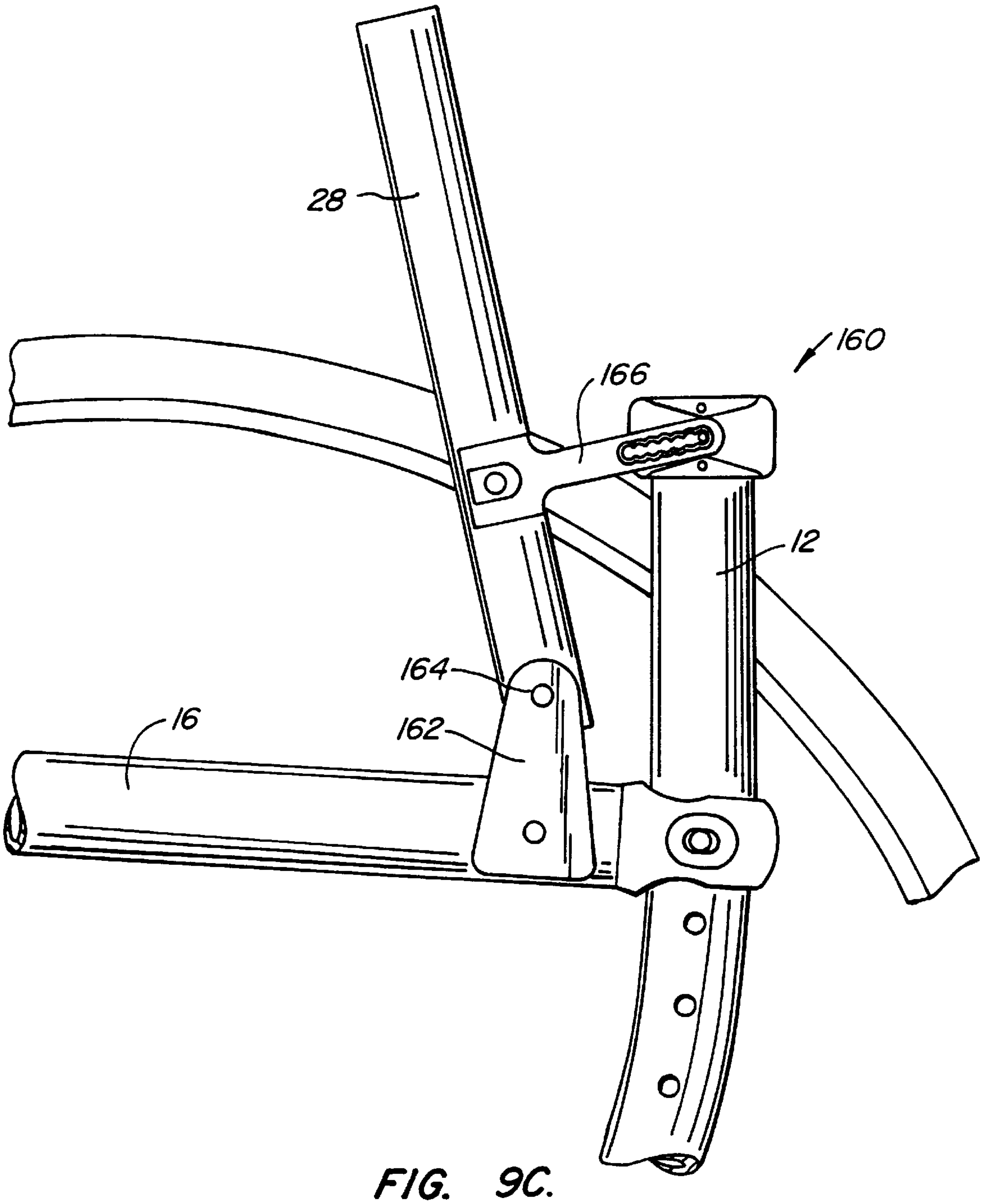
Figure 9D:
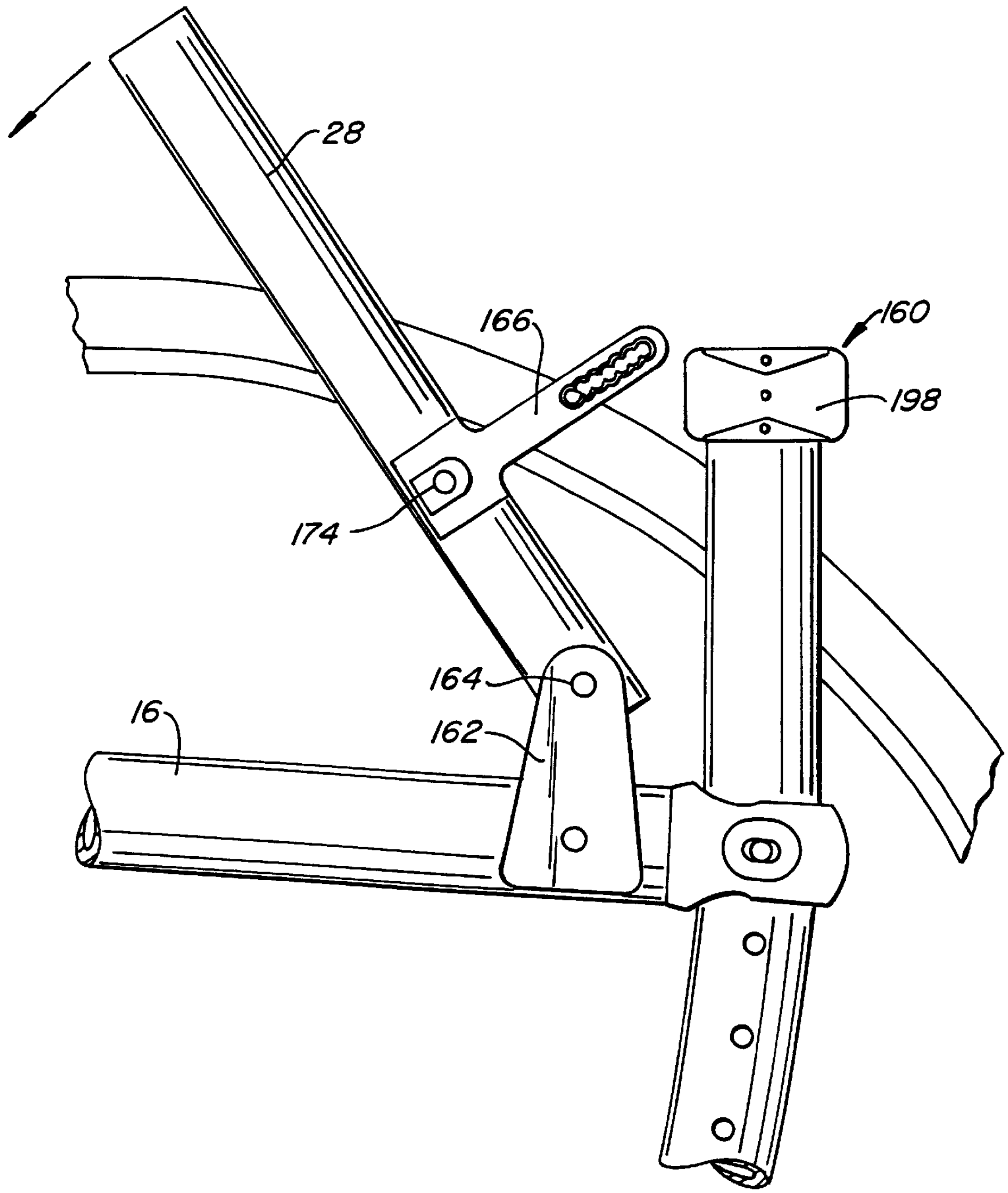

Turning now to FIGS. 8–9D, an adjuster assembly 160 by which the angle of seat back support 28 can be adjusted by the user sitting in the wheelchair, without the use of tools, is described. Each seat back support 28 is mounted to seat portion 16 of frame 4 by a hinge 162 so that seat back support 28 pivots about a pivot 164. To maintain seat back support in a desired orientation, or to permit seat back support 28 to be folded down, an angle adjustment arm 166 is used to couple seat back 28 to rear frame portion 12. Adjustment arm 166 is secured at its forward end to an adjustment arm mounting bracket 170. A bolt 174 passes freely through a hole in seat back support 28 and a hole in the bracket 170 and engages a nut 175. While the position of bracket 170 along seat back support 28 could be adjusted or changed, in practice it is generally left in one position so that bolt 174, instead of some type of quick release fastener, is used.

Arm 166 has a number of intersecting, parallel bores 176 having countersunk ends 178, bores 176 being sized for receipt of the tapered end 180 or a release pin 182. Release pin 182 is biased toward engagement within bores 176 by a compression spring 184. Compression spring 184 is mounted over pin 182 and is captured between the end of a countersunk opening (not shown) formed in an adjustment arm receiver plate 186 and a shoulder 188 adjacent end 180 of pin 182. The outer end 190 of release pin 182 is threaded for being fastened to a pull knob 192 to which a lanyard 194 is secured. Pulling on lanyard 194, which can be accomplished by many wheelchair users while seated in the wheelchair, pulls on pull knob 192 so to compress spring 184 and disengage tapered end 180 of release pin 182 from the bore 176 with which it is aligned.

Adjustment arm 166 is captured between double-tapered faces 196 of an adjustment arm receiver body 198. In the preferred embodiment body 198 is a one-piece integral extension of a slide mount body 200. Receiver body 198 combines with plate 186 to form an adjustment receiver with the two parts secured together by cap screws 202.

Slide mount body 200 includes a central bore 204 which houses an anti-scratch liner 206. The outer surface 208 of liner 206 adheres to the wall of bore 204 using a suitable adhesive. Liner 206 is relatively soft and snugly positions slide mount body 200 about rear frame portion 12. Liner 206 is, in the preferred embodiment, a length of looped fabric material sold under the trademark VELCRO®.

FIG. 9A illustrates seat portion 16 at its topmost position, that is with about a 1" (2.5 centimeter) drop front to back and seat back support 28 generally vertical. To change the orientation of seat back support 28 rearwardly 6.5° to the position of FIG. 9B, lanyard 194 is grasped and pulled upwardly which pulls on pull knobs 192 for each adjuster assembly 160. This withdraws tapered end 180 of each release pin 182 from opening 210 formed in adjustment arm receiver body 198 and at least partially from bore 176 to permit seat back support 28 to be pushed rearwardly causing different holes 176 to become aligned with release pin 182. When the proper position is achieved, lanyard 194 can be released to permit tapered end 180 of release pin 182 to reseat within opening 210 and the appropriately positioned bore 176 and thus lock adjustment arm 166 in position relative to adjuster assembly 160.

FIG. 9C shows seat back support 28 at the opposite extreme, that is angled 12 degrees forward from a vertical axis as opposed to the 6.5 degree backward lean from a vertical axis of FIG. 9B. This is achieved in the same way, that is by pulling lanyard 194 and urging seat back support 28 in the desired direction, in this case forward. As can be seen by comparing the positions of slide mount 200 in FIGS. 9B and 9C, the pivotal movement of seat back support 28 is accommodated by the movement of slide mount body 200 along rear frame portion 12. It is not necessary to lock slide mount body 200 to rear frame portion 12 to maintain seat back support 28 in a desired position. This is because once the release pin 182 is fully housed within a bore 176, a rigid triangle is created between pivot point 164, bolt 174 and release pin 182. Since the length of each leg of the triangle is fixed, a rigid structure results.

Adjuster assembly 160 is shown with adjustment arm 166 extending from seat back support 28. If desired, adjustment arm 166 could extend from rear frame portion 12. Also, regardless of whether adjustment arm 166 extends from seat back support 28 or rear frame portion 12, slide mount body 200 and adjustment arm mounting bracket could be reversed so that slide mount body 200 would be slidable over seat back support 28 and adjustment arm mounting bracket 170 would be fixed to rear frame portion 12.

Also, the use of lanyard 194 provides a simple and inexpensive means for disengaging the release pins to permit seat back supports to be pivoted forward or rearward. If desired, other types of actuators in lieu of lanyard 194 could be used. Also, seat back support 28 could be spring biased in a forward direction, such as by one of a torsion spring at pivot point 164.

FIG. 9D illustrates the complete removal of angle adjustment arm 166 from adjustment arm receiver body 198 to permit seat back support 28 to be folded down to a generally horizontal position adjacent seat portion 6, typically for storage or during transport. Tapered faces 196 aid guiding angle adjustment arm 166 into receiver body 198. Receiver body 198 is made with tapered faces 196 on each side so that a single part, in this case slide mount body 200 and receiver body 198, can be used on the seat back support on either side of the wheelchair.

The toolless, quick adjustability of the present invention also finds utility with relatively low cost, adjustable height wheelchairs, in particular a folding wheelchair shown in FIGS. 10–14. Wheelchair 220 is shown without the conventional fabric seat or backrest in FIG. 10. Wheelchair 220 includes left and right side frame members 222, the right side frame members shown in FIG. 10, the left side frame member being in a mirror image. Frame member 222 includes a lower frame portion 224, an upper frame portion 226, a rear frame portion 228 and a front frame portion 230, all welded or otherwise secured together in a generally rectangular configuration. Each rear frame portion 228 extends upwardly beyond upper frame portion 226 and accepts a push handle, not shown, between which the fabric backrest, not shown, is usually mounted. Frame members 222 are maintained generally parallel to one another using a folding linkage assembly 232, seen best in FIGS. 11A–11C.

Linkage assembly 232 includes a pair of folding cross-bars 234, 236 pivotally connected to one another at their central regions by a pivot 238. The lower ends of cross-bars 234, 236 are connected to lower frame portion 224 through a rotating pivot sleeve 240. Each pivot sleeve 240 is free to pivot about its lower frame portion 224 but is prevented from moving axially along lower frame portion 224 through the use of stops 242 on either end of pivot sleeve 240. Upper frame portions 226 are coupled to cross-bars 234, 236 by links 244, 246, respectively. Links 244, 246 are free to pivot at their lower ends about upper frame portions 226 and are pivotally connected to cross-bars 234, 236 by pivot connections 248. The upper ends of cross-bars 234, 236 are secured to two horizontally oriented seat tubes 250. Seat tubes 250 are, as is conventional, used to stretch a fabric seat therebetween when folded linkage assembly 232 is in the fully open or locked out position of FIG. 11A and FIG. 10.

Wheelchair 220 also includes a pair of front caster wheel assemblies 252 mounted to front frame portions 230. Front caster wheel assemblies 252 are generally similar to caster wheel assemblies 94 using quick release pin assemblies 135; because both are described above they will not be described in detail.

Figure 12:
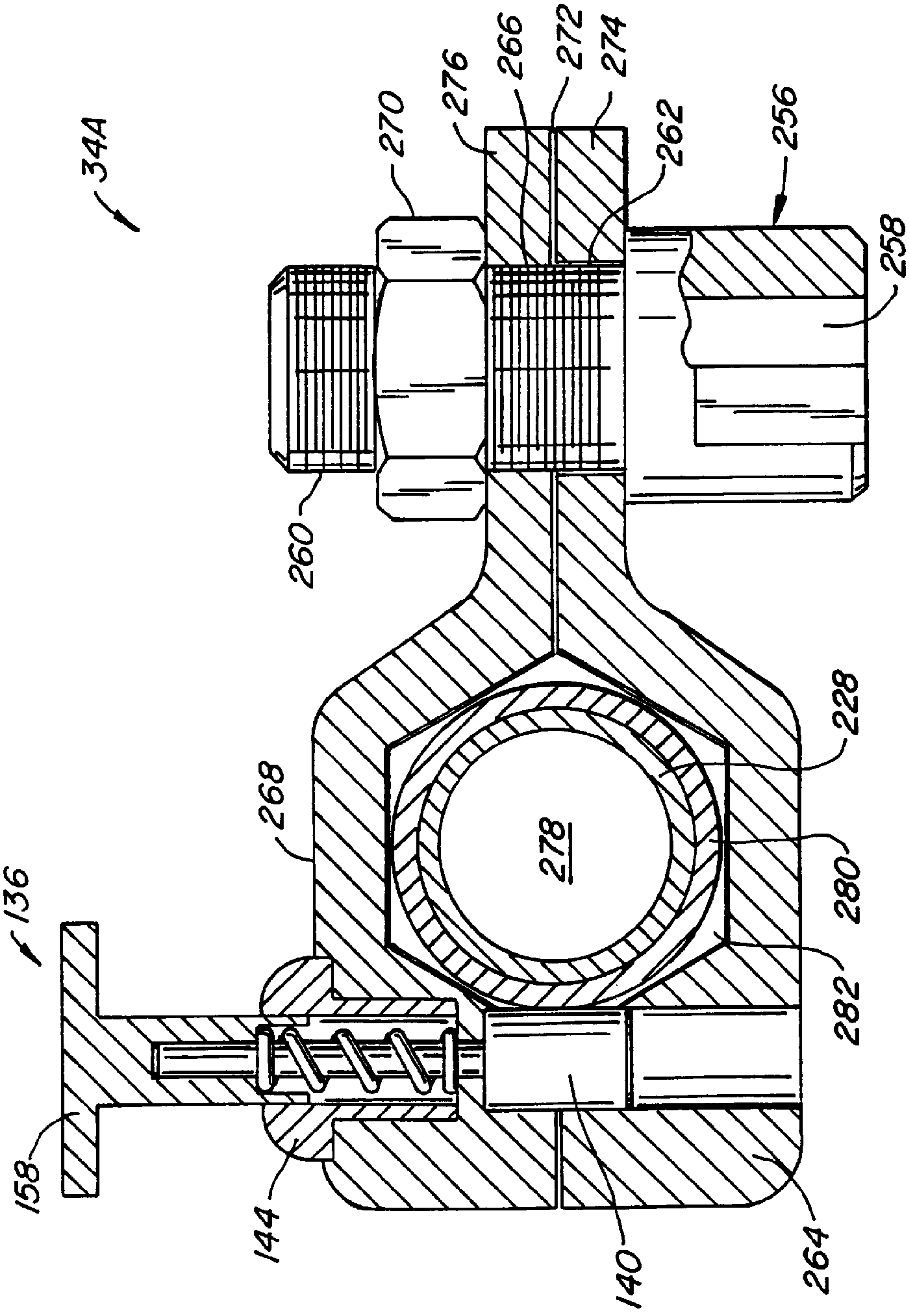
FIG. 12 is a cross sectional view of the axle assembly of FIG. 11.

Wheelchair 220 includes a pair of rear or drive wheels 254 of similar construction as drive wheels 36 discussed above. Each drive wheel 254 is mounted to an axle assembly 34A. Each axle assembly 34A includes an axle receiver 256, see FIG. 12, sized to receive a quick release axle (not shown in FIGS. 10–14) similar to quick release axle 38 shown in FIG. 2. As seen in FIG. 12, axle receiver 256 is essentially a large bolt having a bore 258 formed therethrough for receipt of the quick release axle. The threaded end 260 of axle receiver 256 passes through a clearance hole 262 formed in a first axle adjustment bracket 264 and a threaded hole 266 formed in a second axle adjustment bracket 268. A jam nut 270 is used to lock axle receiver 256 to second axle adjustment bracket 268 once an appropriate adjustment gap 272 is provided between the axle ends 274, 276 of brackets 264, 268.

The other ends of brackets 264, 268 are generally C-shaped and define a hexagonal opening 278 therebetween. Hexagonal opening 278 corresponds to the hexagonal configuration of axle adjustment tube 280 mounted to rear frame portion 228. Axle adjustment tube 280 has a series of annular positioning grooves 282 formed along its length and used to position axle receiver 256 at various heights. This is achieved by the use of a quick release pin assembly 136 described above with reference to FIGS. 6–7B. Pushing on push button 158 causes the larger diameter end 140 to become disengaged from positioning groove 282 to permit axle adjustment brackets 264, 268 and axle receiver 256 therewith to be moved along axle adjustment tube 280 thus changing the height of seat tube 250 relative to the ground surface. The change in axle height preferably takes place along with an adjustment of the height of caster wheel assembly 252, a change in the size of the caster wheels 98, or both.

The hexagonal cross-sectional shape of tube 280 is used to maintain the desired rotary or angular relationship between axle receiver 256 and frame member 222. Other methods for doing this, such as using D-shaped axle adjustment tubes or a pin and slot configuration, in which a pin extending from one of the brackets 264, 268 or the axle adjustment tube 280 engages a vertical slot in the other of the brackets 264, 268 or tube 280, could be used.

Figure 10:
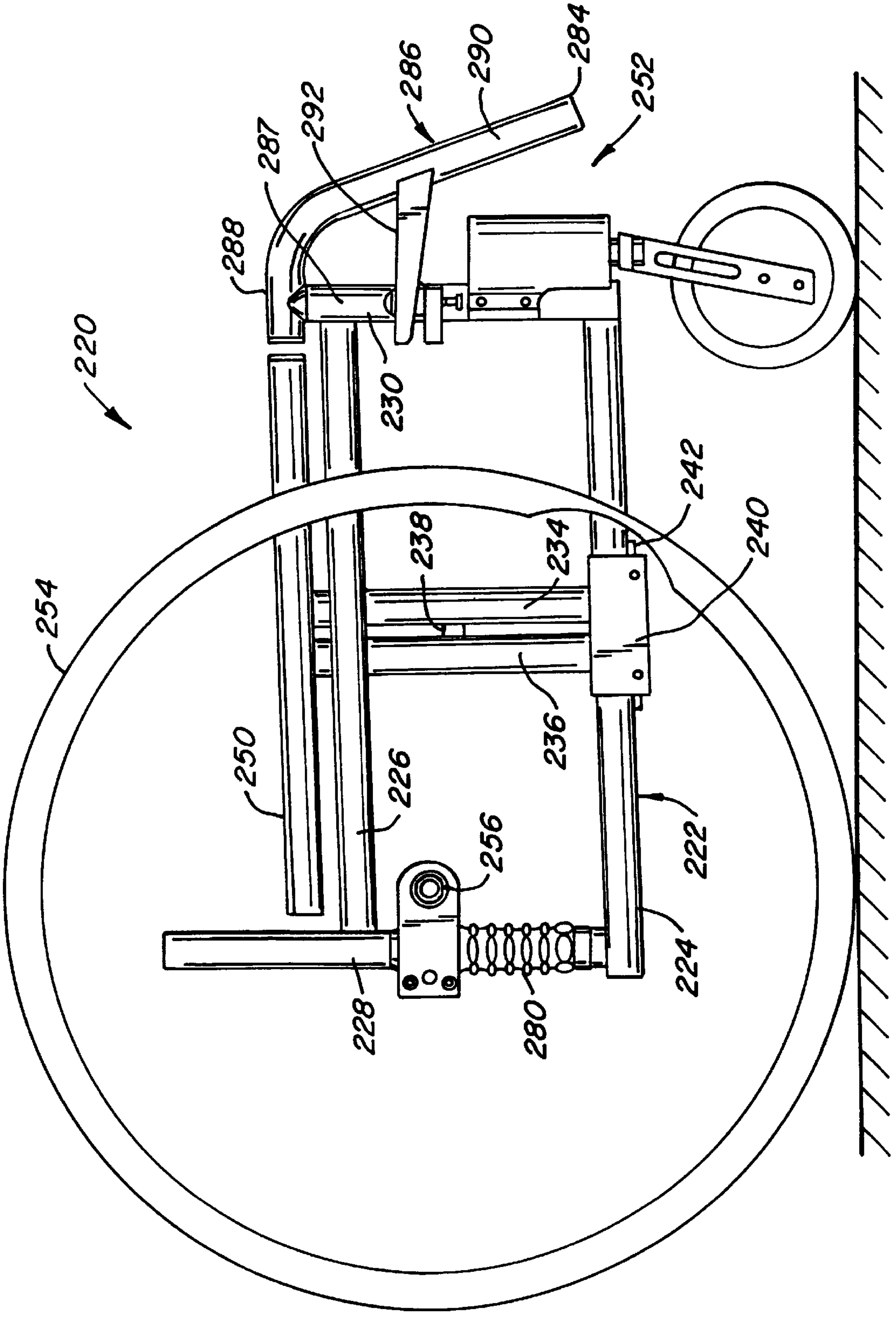
FIG. 10 is a somewhat simplified side view of a variable height, folding wheelchair made according to a further aspect of he invention.
Figure 11:
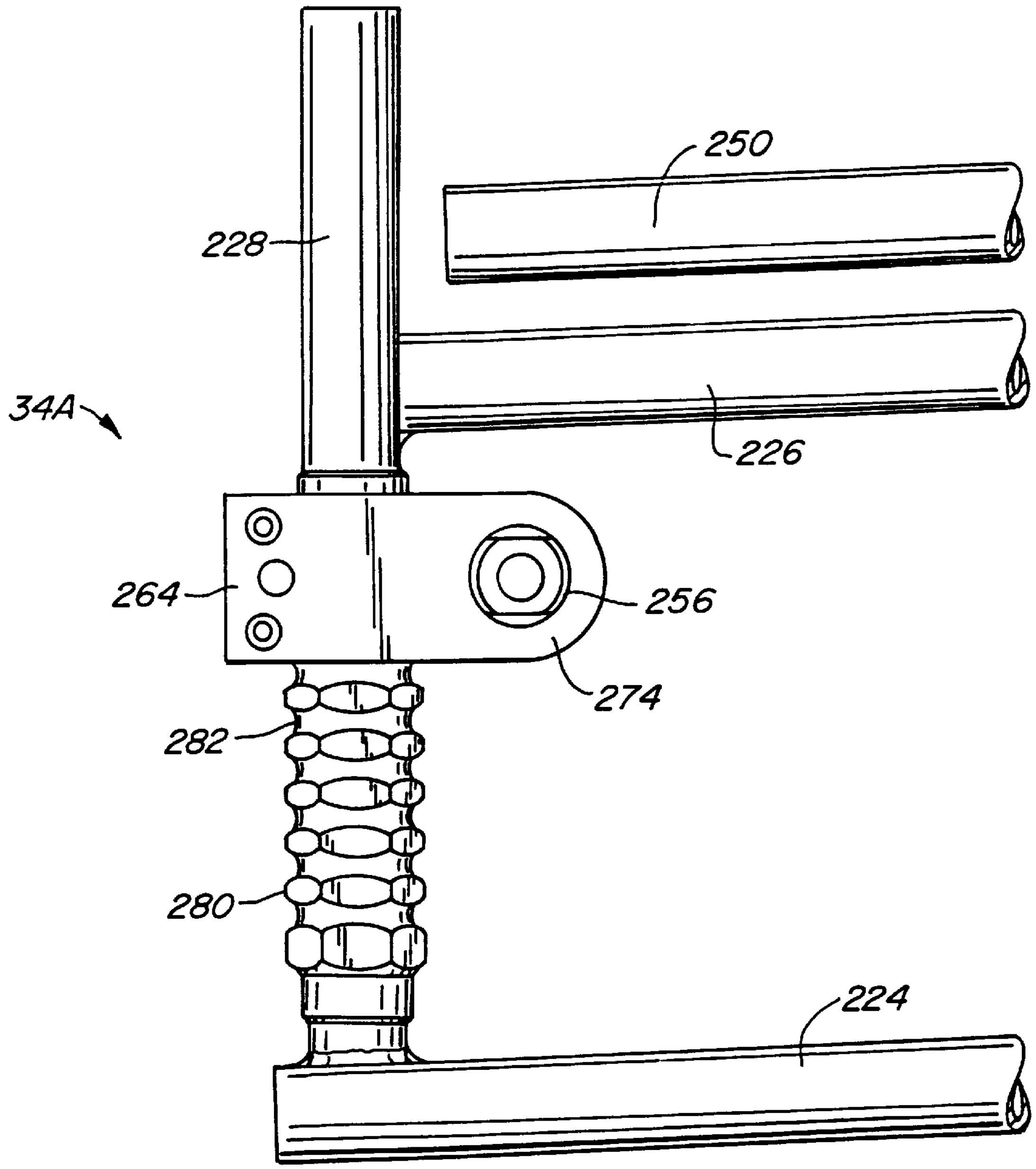
FIG. 11 is an enlarged view of a portion of the wheelchair of FIG. 10 showing the axle assembly.
Figure 11A:
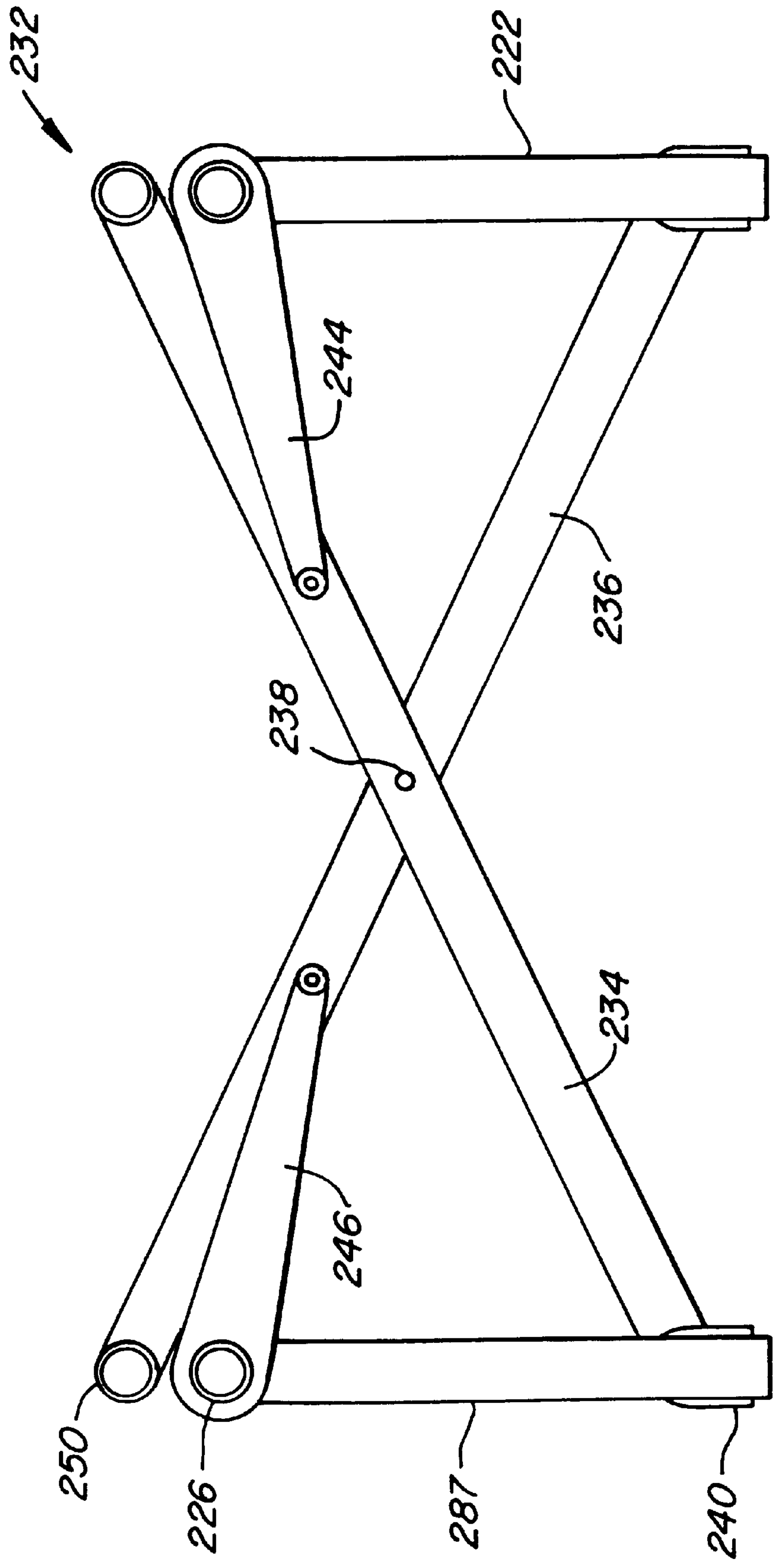
FIGS. 11A–11C illustrate the folding linkage assembly of the wheelchair of FIG. 10 in a fully opened or locked-out position in FIG. 11A, an intermediate folded position in FIG. 11B and a fully folded position in FIG. 11C.
Figure 11B:
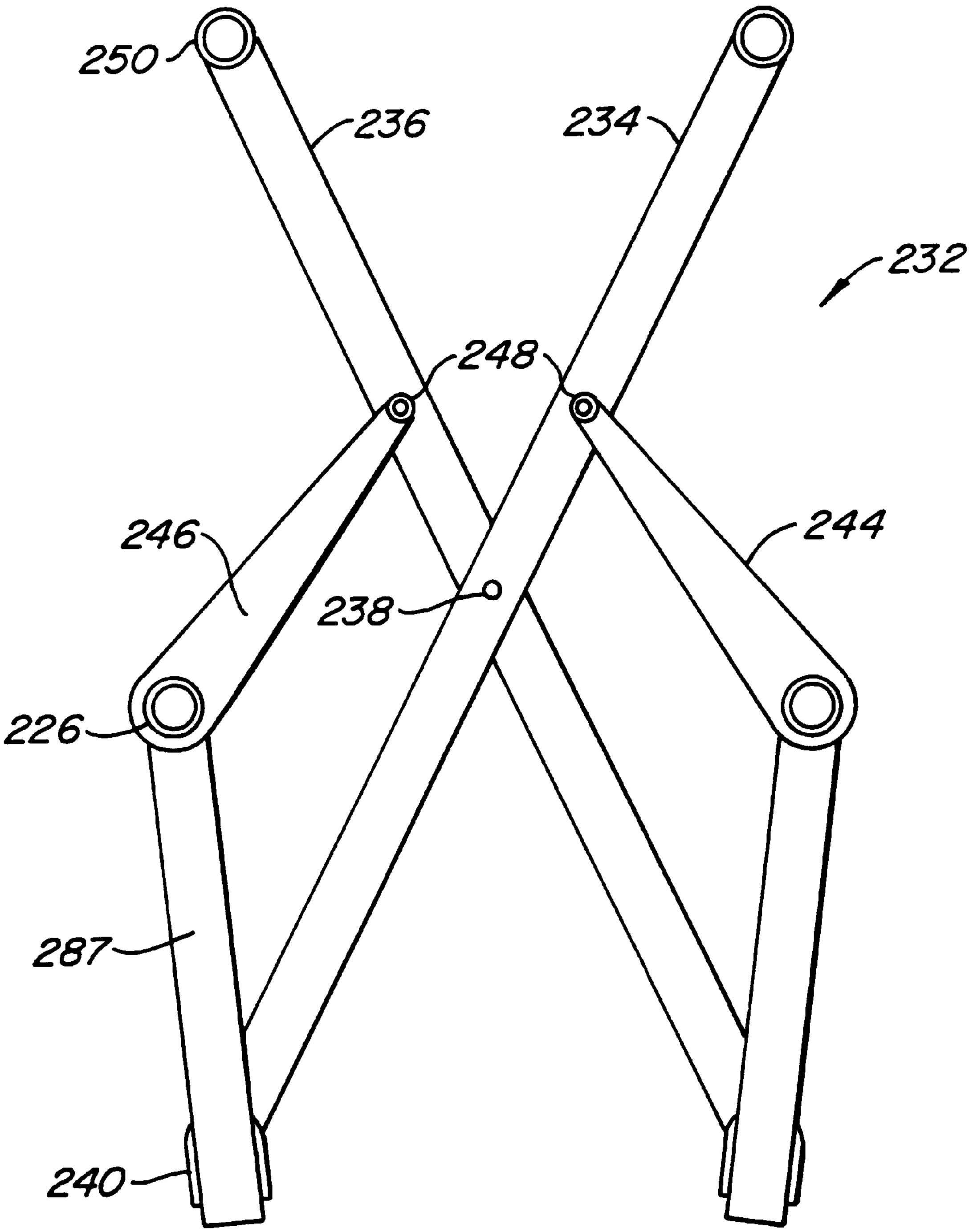
Figure 11C:
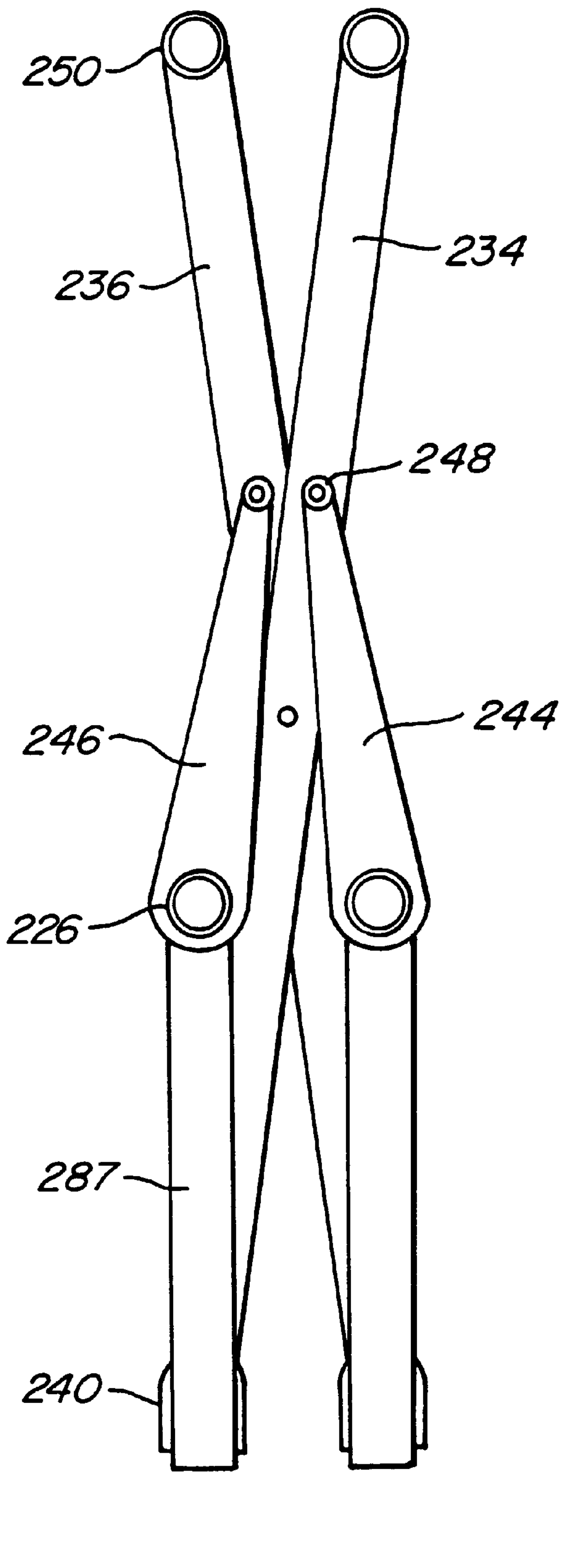

In FIG. 10, axle receiver 256 is shown positioned forward of rear frame portion 228. If desired, axle receiver 256 could be positioned rearward of rear frame portion 228 by flipping axle adjustment brackets 264, 268 upside down so that quick release pin assembly 136 is placed forward of frame portion 228.

A footrest, not shown, is mounted to the lower end 284 of a footrest support 286. Footrest support 286 pivots about an axis 287 passing up through the center of front frame portion 230. See FIGS. 13 and 14. Footrest support 286 has a generally horizontal upper portion 288 which is pivotally supported on the upper end of front frame portion 230 by a rotatable plastic saddle plug 289. The downwardly and outwardly extending lower portion 290 of footrest support 286 is supported by a generally horizontal bracket 292 welded thereto. The inner end 294 of bracket 292 is positioned adjacent front frame portion 230 and is fastened to a release housing 296 by screws 297. Release housing 296 has a C-shaped portion 298 which partially surrounds and slides against front frame portion 230 as support 286 pivots about axis 287. This movement is guided by a quick release pin assembly 136A engaging a quadrant block 300.

Figure 13:
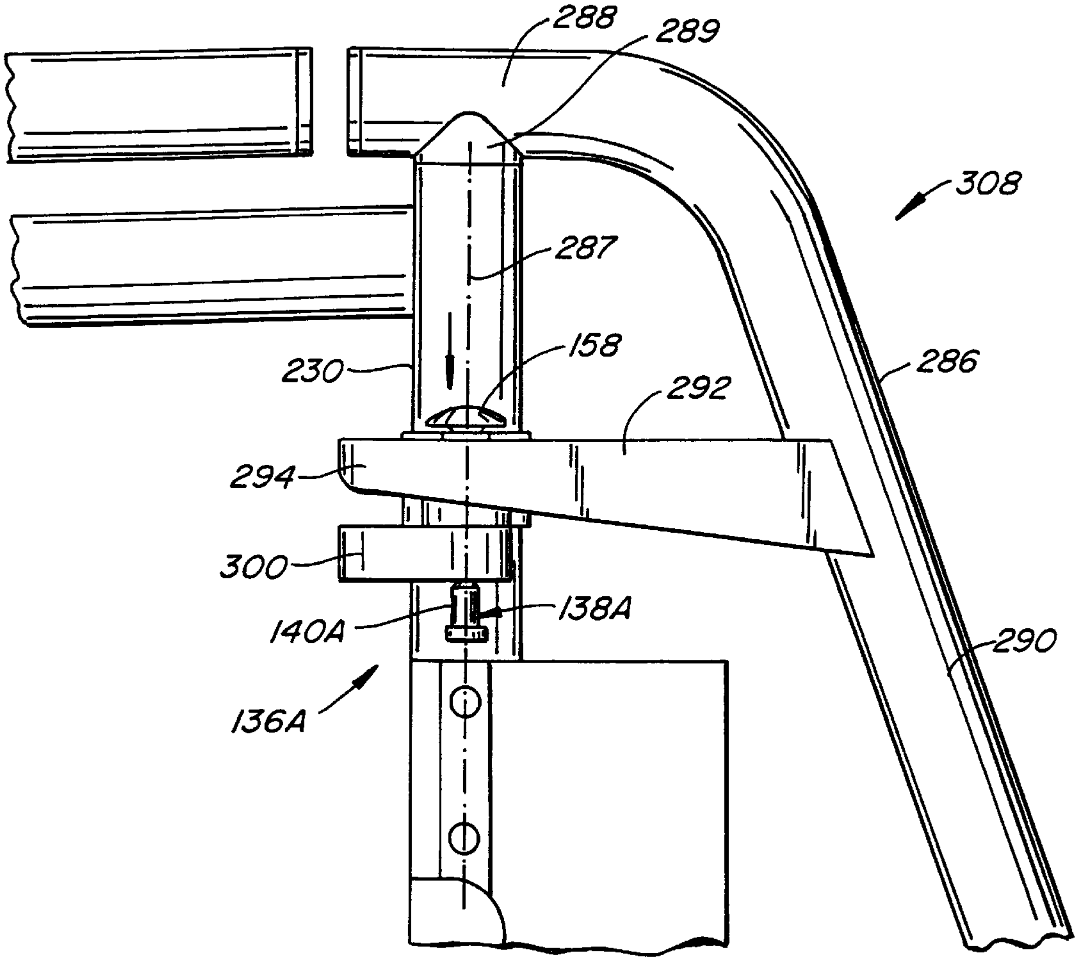
FIG. 13 is an enlarged view of an upper, front portion of the wheelchair of FIG. 10 showing how a pivotal foot rest support is punted to the wheel front frame portion of the wheel chair frame.
Figure 14:
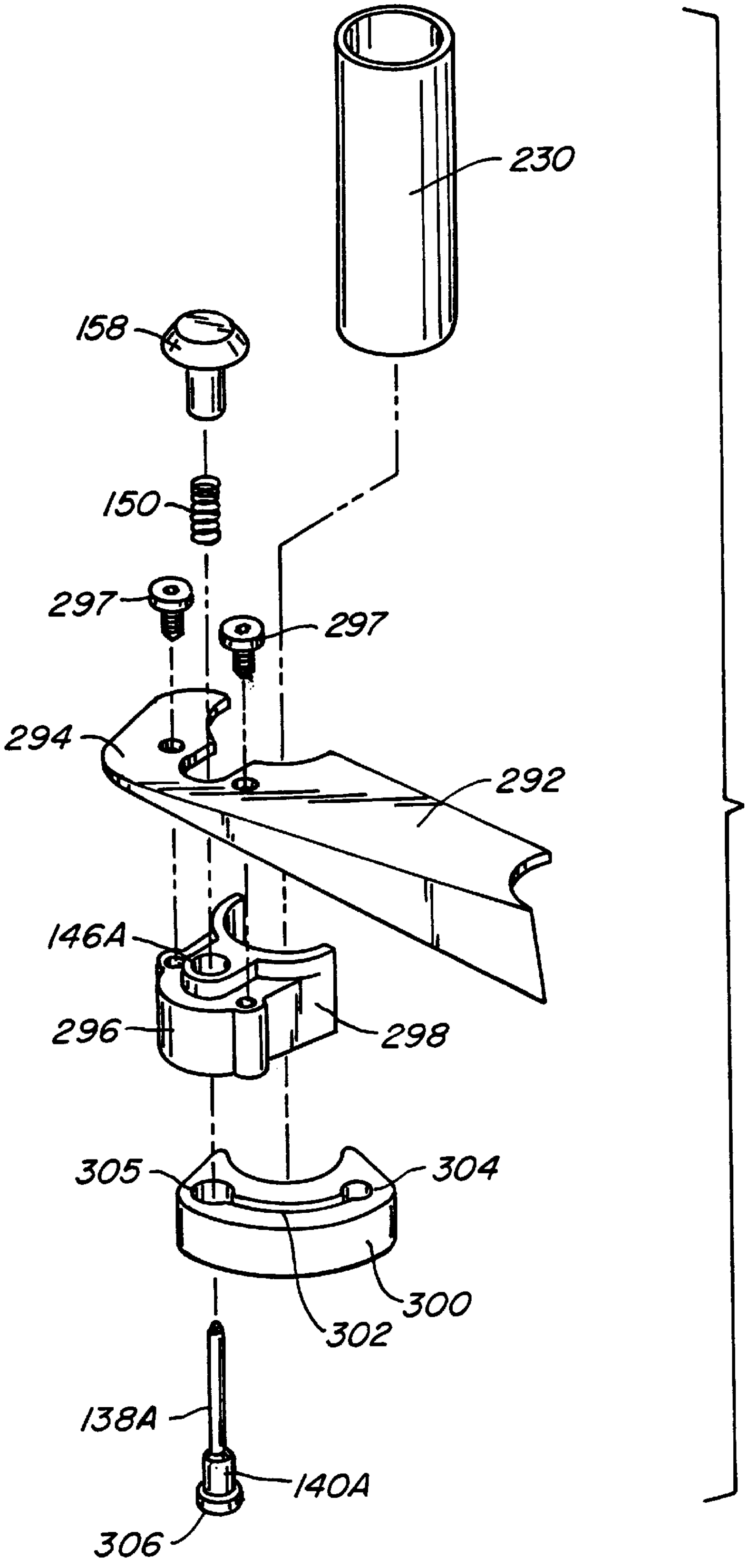
FIG. 14 is an exploded isometric view of the structure of FIG. 13.

Block 300 is secured to, typically bolted to, front frame portion 230. Block 300 has an arcuate slot 302 with enlarged regions 304, 305 at either end. Regions 304, 305 are sized for receipt of larger end 140A of pin 138A so to secure footrest support 286 at either end of its travel. That is, footrest support 286 can be locked into the forwardly extending position of FIGS. 10 and 13 when the user's foot is to be supported above the floor. If is in desired to move the footrest out of the way, such as during certain rehabilitation exercises, the user merely presses on push button 158 (as shown in FIG. 13) to release larger end 140A from enlarged region 304 and permit the smaller diameter end 142A to pass along the slot 302. Once pin 138A is aligned with the enlarged region 305 at the other end of slot 302, spring 150 causes head 306 of enlarged end 140A to engage region 305 and lock footrest support 286 in a laterally extending position (not shown). Region 305 is large enough to permit head 306 to pass through region 305 to permit footrest assembly 308, comprising footrest support 286, bracket 292, quick release pin assembly 136A and release housing 296, to be lifted up and removed from the remainder of wheelchair 220.

In the preferred embodiments, quick release pins engaging circumferential grooves are the toolless means for permitting many of the manual adjustments of axle assembly 34 and caster wheel assembly 94. If desired, other types of toolless engagement devices could be used, such as having the ends of spring-biased pins engaging holes or other depressions in the object to be locked in place. Various thumb screw type, detented twist lock fasteners could be used instead of quick release pins to engage or disengage various grooves according to whether the object is to be moved or locked in place. Instead of having axle adjustment tube 40 fixed to lower frame portion 6, tube 40 could be pinned in place at both ends allowing, for example, 1° shifts in the rotary orientation of the tube to permit adjustments in the camber at other than the set 4° increments available with the first disclosed embodiment. Of course, splines or other similar such engagement elements permitting finer or coarser camber adjustment can also be used. Caster spool 104 and axle lug 54 are shown to be generally cylindrical; they, along with their mating bores, could have shapes other than cylindrical, such as D-shaped; caster spool 104 and axle lug 54 need not rotate within their bores since spindle portion 120 and axle 38 provide the necessary rotation about axis 96 and axis 64, respectively.

Other modifications and variations can be made to the disclosed embodiment without departing from the subject of the invention as defined in the following claims. For example, individual footrests could be used instead of footrest 26.

What is claimed is:

1. A wheelchair assembly comprising:

a frame including a pair of spaced-apart frame portions each having a front end and a back end;

a pair of drive wheels;

a separate axle assembly mounted to each of said frame portions towards the back end, each axle assembly including:

an axle adjustment member securable to a frame portion and having an outer surface; and an axle housing selectively mounted to said axle adjustment member at a plurality of angular attitudes corresponding to a plurality of cambers of the drive wheel;

an axle securing each wheel to said axle housing;

said axle adjustment member and said axle housing including interengaging splined surfaces which permit selectively mounting said axle housing to said axle adjustment member at the plurality of angular attitudes for adjusting the camber for the drive wheel secured to the axle housing;

a caster wheel assembly adjustable mounted at a plurality of heights to each frame portion towards the front end of the frame portion, each caster wheel assembly including a caster wheel and defining an upwardly extending caster wheel pivot axis, whereby the distance between the caster wheel and the frame portion can be changed to accommodate change in the camber of the drive wheels while keeping the caster wheel pivot axis substantially vertical.

2. The assembly according to claim 1 wherein said splined surfaces of said axle adjustment member have a plurality of recesses, and further comprising a movable recess engagement member, selectively engageable with and disengageable from said recesses, carried by said axle housing to permit a front to back position of the drive wheel axis to be selected and changed.

3. The assembly according to claim 1, and wherein each axle assembly includes means for toollessly securing the axle housing to the axle adjustment member.

4. The assembly according to claim 1 and further including:

a separate caster spool housing secured to each frame portion, each caster spool housing defining a caster spool cavity;

and wherein each caster wheel assembly includes a caster spool having an upper end sized for engagement within a caster spool cavity and defining the generally vertical caster wheel pivot axis, the caster wheel in the caster wheel assembly having a generally horizontal axis of rotation, and a wheel mount pivotally mounting the caster wheel assembly to a caster spool so that the horizontal axis of the wheel is laterally offset from the caster wheel pivot axis, and a spindle extending upwardly from the wheel mount for rotation of said spindle within the caster spool about said caster wheel pivot axis.

5. The assembly according to claim 4 and further including means for toollessly securing the caster spool of each caster wheel assembly to a caster spool housing.

6. In combination with a wheelchair having a frame including a generally upwardly extending rear frame portion, an adjustable seat back assembly comprising:

a seat back support mounted on said frame for pivotal movement about a pivot axis between first and second orientations, said pivot axis being fixed relative to said frame;

a first angle adjustment member mounted to one of said seat back support and said rear frame portion at a location above said pivot axis;

a user-operable adjuster assembly mounted to the other of said seat back support and said rear frame portion at a location above said pivot axis, said adjuster assembly comprising:

a second angle adjustment member sized for cooperation with said first adjustment member as said seat back support is pivoted between said first and second orientations; and a toolless, user-operated adjustment member lock for releasably securing said first adjustment member to said second adjustment member to hold said seat back in a selected one of a plurality of angular positions; and a slide mount by which one of said first adjustment member and said adjuster assembly is mounted to slide on one of said seat back support or said rear frame portion relative to said pivot axis as said seat back support is pivoted about said pivot axis between different angular positions.

7. The assembly according to claim 6 wherein said seat back support has a lower end pivotally mounted to said frame.

8. The assembly according to claim 6 wherein said first adjustment member is secured to said seat back support and includes an adjustment arm adapted to engage said second adjustment member.

9. The assembly according to claim 6 wherein said slide mount mounts said adjuster assembly to slide on said rear frame portion.

10. The assembly according to claim 6 wherein said adjustment member lock includes a pull-to-release member which is spring biased to normally lock together said first and second adjustment members.

11. The assembly according to claim 10 wherein said adjuster assembly further includes a lanyard secured to said pull-to-release member.

12. The assembly according to claim 6 wherein said user-operated adjustment assembly is located to be operable by a user seated in said wheelchair.

13. The assembly according to claim 6 further comprising two of said first and second angle adjustment members, said adjuster assemblies and said slide mounts.

14. The assembly according to claim 6 wherein said adjustment member has a plurality of recesses and said adjustment member lock includes a release pin sized and positioned to releasably engage selected ones of said recesses, and a spring biasing said release pin to engage a selected one of said recesses.

15. The assembly according to claim 6 wherein said slide mount includes a slide mount body housing an anti-scratch liner.

* * * * *